US011942590B2

(12) United States Patent
Koetting et al.

(10) Patent No.: US 11,942,590 B2
(45) Date of Patent: Mar. 26, 2024

(54) BATTERY MODULE INCLUDING NODAL CELL COMPRESSION AND HEAT REJECTION

(71) Applicants: William Koetting, Rochester, MI (US); Michael Joseph Nielson, Royal Oak, MI (US)

(72) Inventors: William Koetting, Rochester, MI (US); Michael Joseph Nielson, Royal Oak, MI (US)

(73) Assignee: Prime Energy Contract Services LLC, Troy, MI (US)

( * ) Notice: Subject to any disclaimer, the term of this patent is extended or adjusted under 35 U.S.C. 154(b) by 259 days.

(21) Appl. No.: 17/378,620

(22) Filed: Jul. 16, 2021

(65) Prior Publication Data

US 2021/0344070 A1 Nov. 4, 2021

Related U.S. Application Data

(62) Division of application No. 16/204,684, filed on Nov. 29, 2018, now Pat. No. 11,121,426.
(Continued)

(51) Int. Cl.
*H01M 10/04* (2006.01)
*H01M 10/0525* (2010.01)
(Continued)

(52) U.S. Cl.
CPC ... *H01M 10/0413* (2013.01); *H01M 10/0481* (2013.01); *H01M 50/211* (2021.01);
(Continued)

(58) Field of Classification Search
CPC .. H01M 50/103; H01M 50/105; H01M 50/20; H01M 50/202; H01M 50/204; H01M 50/207; H01M 50/209; H01M 50/211; H01M 50/213; H01M 50/216; H01M 50/218; H01M 50/22; H01M 50/222;
(Continued)

(56) References Cited

U.S. PATENT DOCUMENTS 5,279,623 A * 1/1994 Watanabe .............. H01G 11/74
29/25.03
6,304,057 B1 10/2001 Hamada et al.
(Continued)

FOREIGN PATENT DOCUMENTS

WO 2005119813 A2 12/2005

*Primary Examiner* — Matthew W Van Oudenaren
(74) *Attorney, Agent, or Firm* — Robert F. Billings, PLLC

(57) ABSTRACT

A battery module having a battery cell assembly that is free from module banding is provided. The assembly includes an expandable battery cell having a first and second face. The assembly further includes a growth plate having a first and second face. The first face of the battery cell contacts the second face of the growth plate. The battery cell assembly further includes a first cell frame securing the growth plate on at least two sides and a second cell frame that contacts the second face of the battery cell. The first face of the growth plate includes a plurality of spacing features disposed along the first face of the growth plate that offset the first face of the growth plate from the first cell frame, which creates a cavity between the growth plate and the first cell frame. The cavity decreases when the battery cell expands.

20 Claims, 17 Drawing Sheets

Related U.S. Application Data

(60) Provisional application No. 62/592,851, filed on Nov. 30, 2017.

(51) Int. Cl.
| | |
|---|---|
| *H01M 50/103* | (2021.01) |
| *H01M 50/178* | (2021.01) |
| *H01M 50/211* | (2021.01) |
| *H01M 50/218* | (2021.01) |
| *H01M 50/291* | (2021.01) |
| *H01M 50/55* | (2021.01) |
| *H01M 50/557* | (2021.01) |

(52) U.S. Cl.
 CPC ....... *H01M 50/218* (2021.01); *H01M 50/291* (2021.01); *H01M 10/0525* (2013.01); *H01M 50/103* (2021.01); *H01M 50/178* (2021.01); *H01M 50/55* (2021.01); *H01M 50/557* (2021.01); *H01M 2220/20* (2013.01)

(58) Field of Classification Search
 CPC .............. H01M 50/224; H01M 50/227; H01M 50/229; H01M 50/231; H01M 50/233; H01M 50/236; H01M 50/238; H01M 50/24; H01M 50/242; H01M 50/244; H01M 50/247; H01M 50/249; H01M 50/251; H01M 50/253; H01M 50/256; H01M 50/262; H01M 50/264; H01M 50/267; H01M 50/269; H01M 50/271; H01M 50/273; H01M 50/276; H01M 50/278; H01M 50/28; H01M 50/282; H01M 50/284; H01M 50/287; H01M 50/289; H01M 50/291; H01M 50/293; H01M 50/296; H01M 50/298; B60L 50/64

See application file for complete search history.

(56) References Cited

U.S. PATENT DOCUMENTS

| | | | |
|---|---|---|---|
| 6,569,561 B1 | 5/2003 | Kimura et al. | |
| 6,610,443 B2 | 8/2003 | Paulot et al. | |
| 8,067,111 B2 | 11/2011 | Koetting et al. | |
| 8,309,248 B2 | 11/2012 | Koetting et al. | |
| 8,399,119 B2 | 3/2013 | Koetting et al. | |
| 8,426,050 B2 | 4/2013 | Koetting et al. | |
| 8,449,998 B2 | 5/2013 | Koetting | |
| 8,628,872 B2 | 1/2014 | Koetting et al. | |
| 8,662,153 B2 | 3/2014 | Koetting et al. | |
| 9,140,501 B2 | 9/2015 | Niedzwiecki et al. | |
| 9,147,916 B2 | 9/2015 | Bronczyk et al. | |
| 9,203,125 B2 | 12/2015 | Bronczyk et al. | |
| 9,337,456 B2 | 5/2016 | Koetting et al. | |
| 10,103,367 B2 | 10/2018 | DeKeuster et al. | |
| 2003/0077508 A1 | 4/2003 | Asahina et al. | |
| 2003/0124416 A1* | 7/2003 | Kaneta | H01M 10/0413 429/176 |
| 2005/0042511 A1 | 2/2005 | Kaneta | |
| 2005/0123828 A1 | 6/2005 | Oogami et al. | |
| 2006/0204840 A1 | 9/2006 | Jeon et al. | |
| 2010/0275619 A1 | 11/2010 | Koetting et al. | |
| 2016/0268643 A1 | 9/2016 | Mack et al. | |
| 2017/0331089 A1* | 11/2017 | Hashimoto | H01M 50/291 |

\* cited by examiner

BATTERY MODULE INCLUDING NODAL CELL COMPRESSION AND HEAT REJECTION

CROSS-REFERENCE TO RELATED APPLICATIONS

This application is a divisional of U.S. patent application Ser. No. 16/204,684 filed on Nov. 29, 2018 which claims priority of U.S. Provisional Patent Application 62/592,851 filed on Nov. 30, 2017, the disclosures of which are hereby incorporated by reference in their entireties.

TECHNICAL FIELD

Embodiments described herein generally relate to the field of batteries and battery modules. More specifically, the present disclosure is directed to battery cell packaging as it relates to battery cell compression and heat rejection.

BACKGROUND

Design requirement goals of any battery pack is to improve safety and to extend the operational life of the battery cell. However, designs that that promote these goals usually have an associated increased complexity penalty, which translates into increased costs.

Large-scale battery packs, large enough for use in electric powertrains in hybrid and electric vehicles, may be modular by design to assist in the manufacturability of the pack. The popular battery cell used by these families of battery packs is a lithium-ion pouch-type cell. The pouch cell offers an efficient and lightweight solution to battery pack design while meeting the high automotive power requirements. The pouch cells are typically retained in battery cell carriers to provide support and the ability to expand, which may then be stacked together to form battery modules.

It is generally known that lithium-ion pouch-type cells perform better over their operational life if pressure is applied to the cell. More specifically, the pouch-type cell can provide more charge and discharge cycles at a given capacity over the life of cell if a consistent and uniform pressure is applied to the faces of the cell. One way to achieve the pressure over the face of the cell is to place the cell into the battery cell carrier, stack multiple carriers together such that the cell faces are in line with each other, and band the resulting module under a band tension. The tension of the band around the periphery of all cell carriers propagates a pressure among the faces of the cells. However, this technique applies pressure at the module level and lacks consistent uniform pressure at any particular cell face.

Provisions may be made for swelling or "growth" of the pouch-type lithium-ion cells. Variability of the pressure profile along the face the cell occurs as the cell expands over the operational life of the cell. The individual cell faces can migrate away from one another over the life of the battery and frustrate the cell pressure profile.

Battery packs generate heat during usage. In order to maintain or increase the operational life of the battery cell, the heat needs to be effectively channeled away from the cell. Active cooling techniques exist to dissipate the heat generated by the cells. However, most active cooling systems involve a significant number of components, add to the overall size and weight of the battery pack, and are often costly.

Accordingly, it is recognized that traditional battery modules may be subject to further improvements. An opportunity exists for increasing the operational life of the battery cell while reducing the mechanical complexity of the battery module design.

SUMMARY

Example systems and methods are disclosed herein that relate to battery cell packaging into modules that offer uniform pressure along the faces of battery cell, thermally conductive paths that direct heat away from both sides of the battery cell and a reduced battery module part count that is free from module banding.

A battery cell assembly in accordance with an exemplary embodiment is provided. The battery cell assembly includes a battery cell capable of expanding and has a first face and a second face opposite the first face. The first face of the battery cell moves away from the second face as a result of the battery cell expanding. The battery cell assembly further includes a growth plate having a first face and a second face opposite the first face, and the first face of the battery cell contacts the second face of the growth plate. The battery cell assembly further includes a first cell frame that secures the growth plate on at least two sides of the growth plate, and a second cell frame that contacts the second face of the battery cell. The first face of the growth plate includes a plurality of spacing features disposed along the first face of the growth plate. Each of the plurality of spacing features has a protruding portion extending away from the first face of the growth plate and contacting the first cell frame. The plurality of spacing features offset the first face of the growth plate from the first cell frame, which creates a cavity between the first face of the growth plate and the first cell frame. The cavity decreases when the battery cell expands.

In one embodiment, a method of providing a uniform pressure along battery cell faces of a battery cell assembly is provided. The battery cell assembly method includes securing a growth plate within a first cell frame on at least two sides of the growth plate. The growth plate has a first face and a second face opposite the first face. The first face of the growth plate includes a plurality of spacing features disposed along the first face of the growth plate and each of the plurality of spacing features has a protruding portion extending away from the first face of the growth plate and contacting the first cell frame. The plurality of spacing features offset the first face of the growth plate from the first cell frame. The method further includes placing a battery cell that has a first face and a second face opposite the first face within the first frame such that the first face of the battery cell contacts the second face of the growth plate. The method includes aligning an outer peripheral of a second cell frame within an outer peripheral of the first cell frame such that the second cell frame contacts the second face of the battery cell. The method further includes coupling the first cell frame to the second cell frame along an overlap of the outer peripheral of the first cell frame and the outer peripheral of the second cell frame such that a uniform pressure is applied along both the first and second faces of the battery cell.

DETAILED DESCRIPTION

Systems, methods and other embodiments associated with a battery module that provide uniform cell face pressure, which takes into account battery cell expansion over the life of the battery cell, and thermally conductive paths for directing heat away from both faces of the battery cell are discussed herein. The battery module of the present disclosure includes a plurality of battery cells, cell frames and growth plates. The cell frames can provide a uniform cell pressure directly to both faces of a pouch-type battery cell. Two adjacent cell frames sandwich one battery cell and one growth plate therebetween. The adjacent cell frames are pressed together against both the cell and the growth plate, and a uniform cell face pressure is thereby maintained on the cell by coupling the adjacent cell frames together around their periphery. The growth plate is compliant and allows for cell expansion over the operating life of the battery cell. The cell frame and the growth plate, which are both formed of a metallic material to provide thermal conductivity, sandwich the battery cell in place and transfer heat from the battery to the edges of the battery module. The cell frames include an integrated heat sink that protrudes from the edge of the battery module and acts as a passive heat exchanger capable of transferring heat generated by the cells directly to a fluid medium such as air.

The resulting battery module provides uniform cell pressure directly to the cell faces instead of a propagated pressure from a module level peripheral tension band. In other words, the battery module is free from banding around the periphery of the battery module. The growth plate, which is in direct contact with one of the battery cell faces, is compliant allowing for cell growth while maintaining a uniform cell pressure along the face of the cell. The resulting battery module provides for thermally conductive paths for both faces of the cell. The battery module gains structural rigidity from the thickness of the cell frames and the growth plates, as well as from bonding the growth plates to the cell frames and bonding the cell frames to each other. The resulting battery module eliminates fasteners, nuts, bolts, bands, etc. that are needed to assemble a standard battery module, thus reducing module mechanical parts count.

Further areas of applicability will become apparent from the description provided herein. It should be understood that the description and specific examples are intended for purposes of illustration only and are not intended to limit the scope of the present disclosure.

Figure 1:
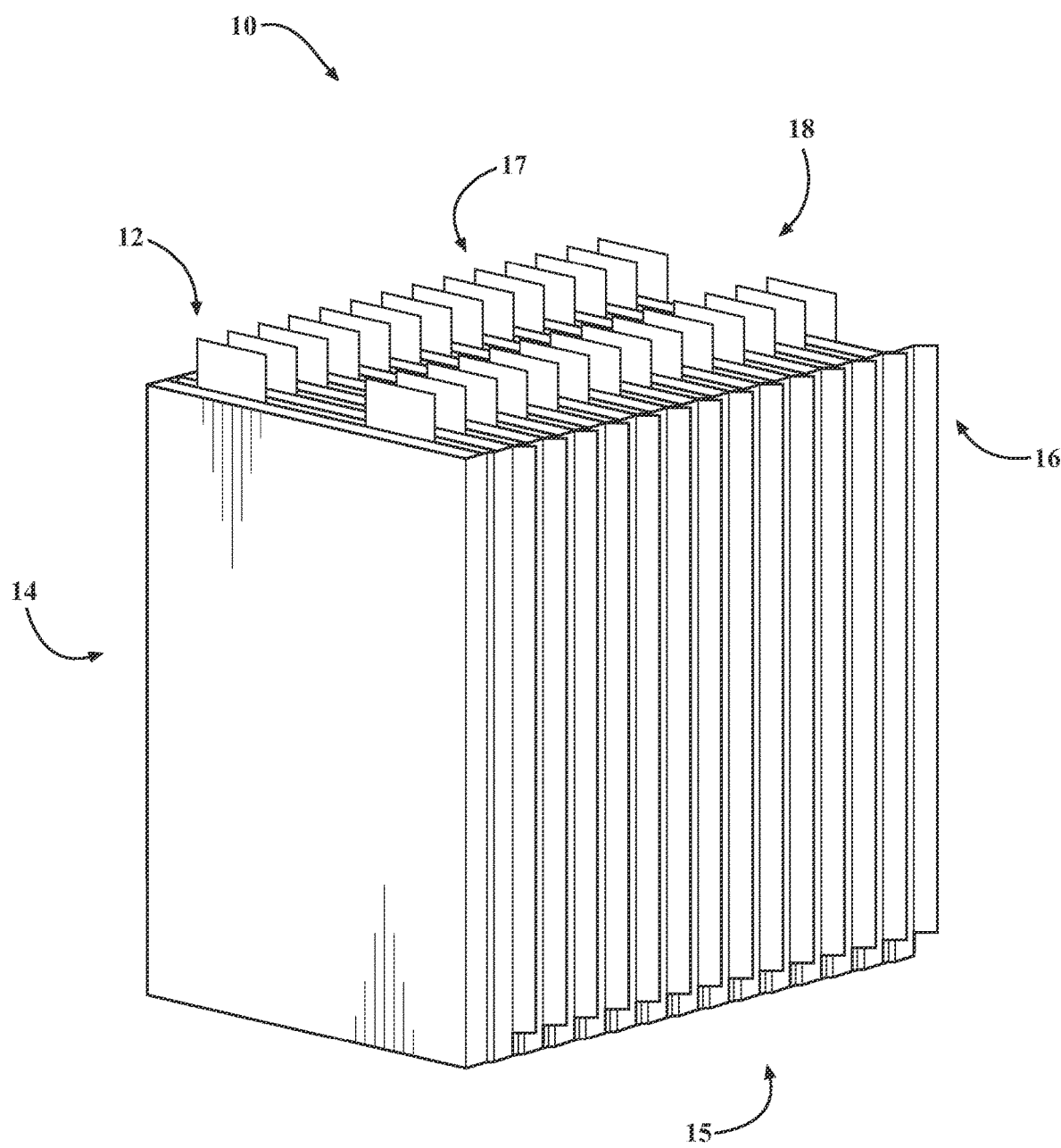
FIG. 1 is a perspective view of an example battery module.

Referring to FIG. 1, an example of a battery module 10 is illustrated. The battery module 10 is useful for many applications and may be configured to provide electrical power to, for example, a primary drive train of a vehicle, an auxiliary drive train of a vehicle, etc. For purposes of discussion, only certain portions of the battery module 10 will be described in greater detail below. In particular, as shown in FIG. 1, a first portion 12 of the battery module 10 is located at a first end 14, and a terminating portion 16 of the battery module 10 is located at a terminating end 18. Additionally, the battery module 10 includes a first side 15 and a second side 17 opposite the first side.

Figure 2:
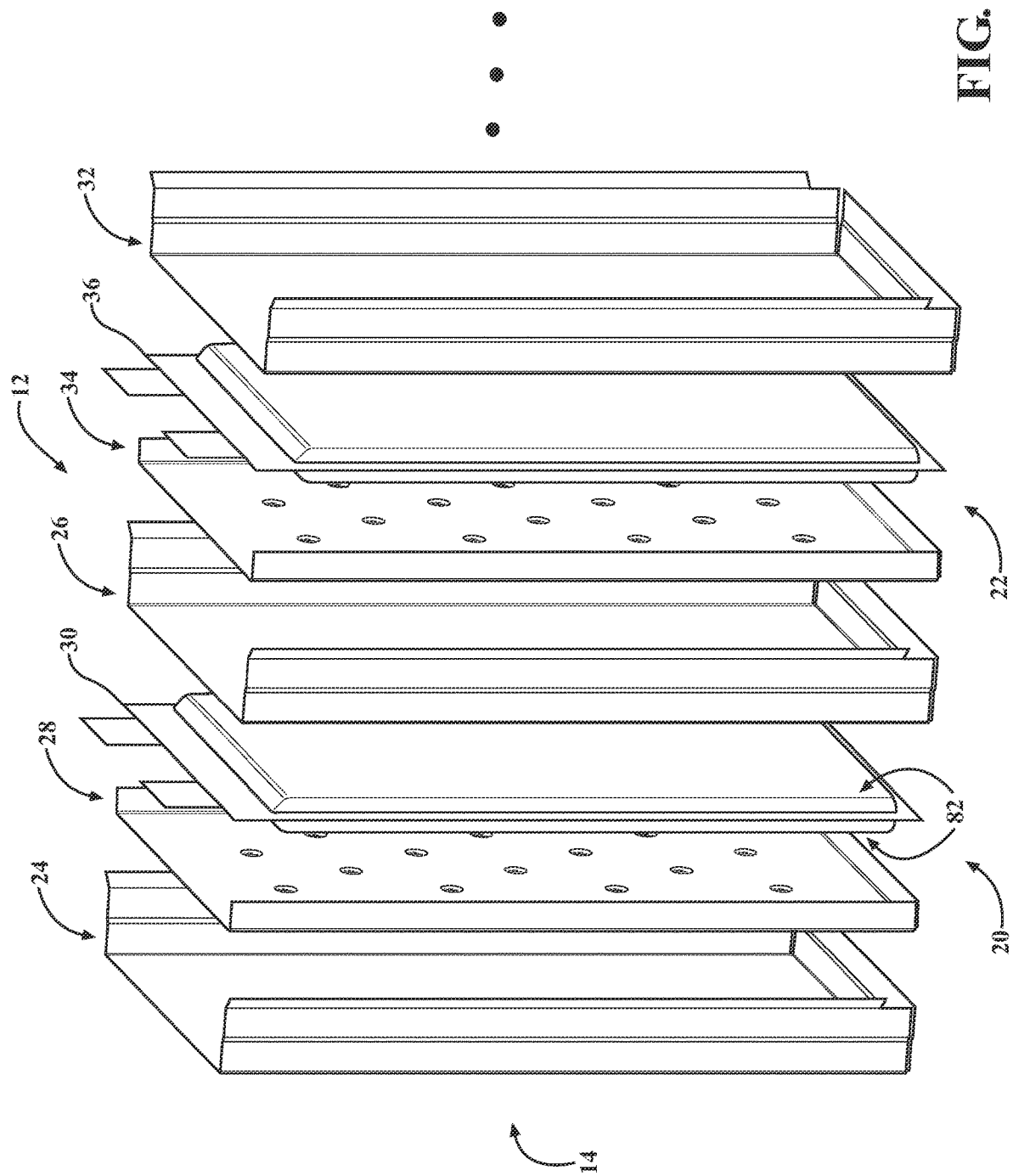
FIG. 2 is an exploded perspective view of two battery cell assemblies at a first end of the battery module of FIG. 1.

With reference to FIG. 2, two battery cell assemblies are illustrated in an exploded view at the first end 14 of the battery module 10. The first portion 12 includes, a first battery cell assembly 20 and a second battery cell assembly 22. The first battery cell assembly 20 includes cell frames 24, 26, a growth plate 28, and a battery cell 30. The second battery cell assembly 22 includes cell frames 26, 32, a growth plate 34, and a battery cell 36. The battery cell assemblies 20, 22 share the cell frame 26. For purposes of simplicity, only the first battery cell assembly 20 will be discussed in further detail below. Cell frame 24 has an identical structure as cell frame 26. Common numerals are used to identify common features in the cell frame 24 and the cell frame 26.

The cell frames 24, 26 are configured to be coupled together to hold the battery cell 30 and the growth plate 28 therebetween, as will be discussed in greater detail below.

Figure 3:
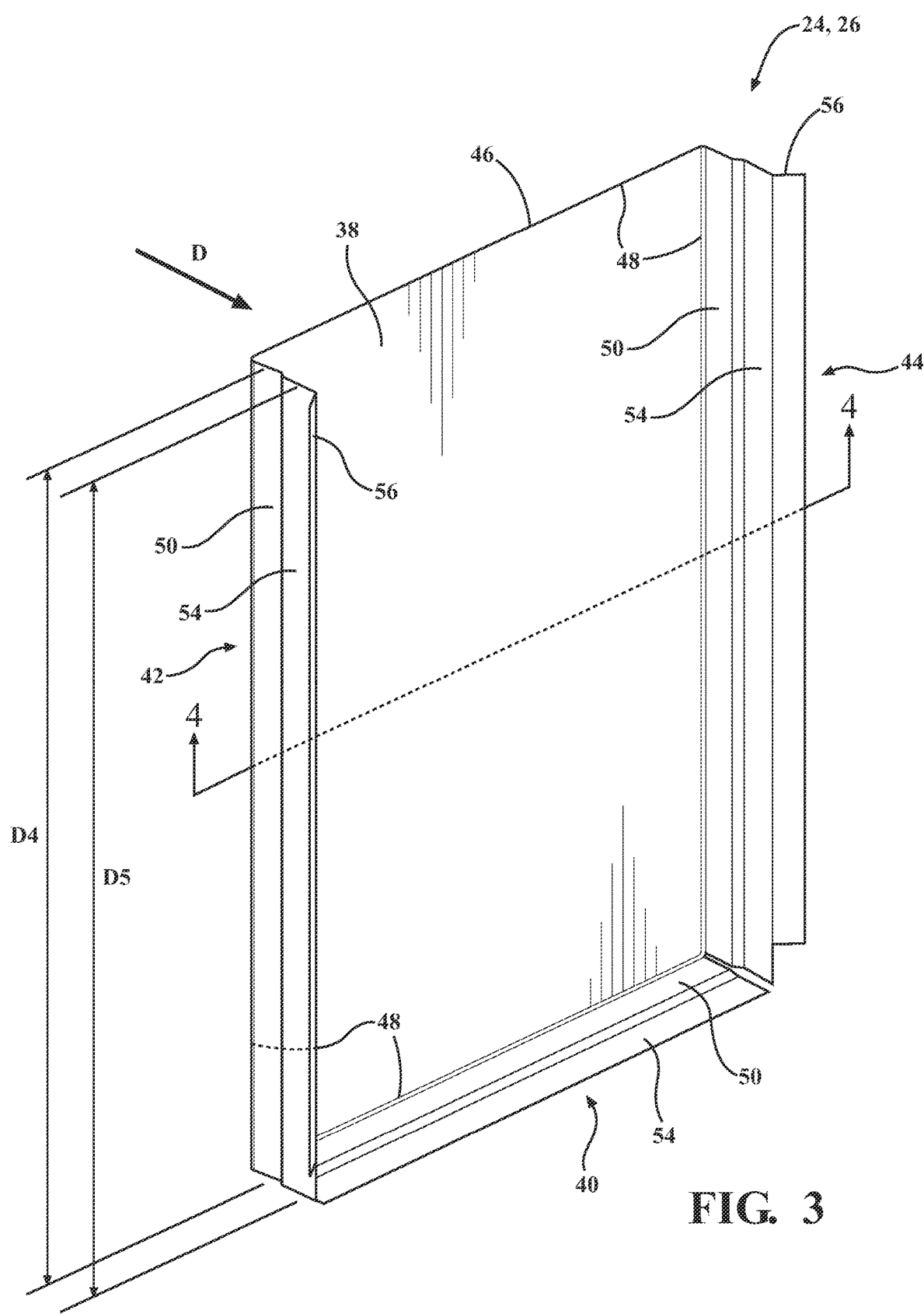
FIG. 3 is a perspective view of a cell frame.

Referring to FIG. 3, the cell frames 24, 26 are shown. The cell frames 24, 26 include a plate 38, a bottom member 40, a first side member 42, and a second side member 44. The bottom member 40 is spaced from a top edge 46 of the plate 38 and extends away from a peripheral edge 48 of the plate 38 in a direction D. The first side member 42 extends away from the peripheral edge 48 in the direction D. The first side member 42 extends transversely relative to the bottom member 40 between the bottom member 40 and the top edge 46. The second side member 44 is spaced from the first side member 42 and extends away from the peripheral edge 48 in the direction D. The second side member 44 extends transversely relative to the bottom member 40 between the bottom member 40 and the top edge 46.

Figure 4:
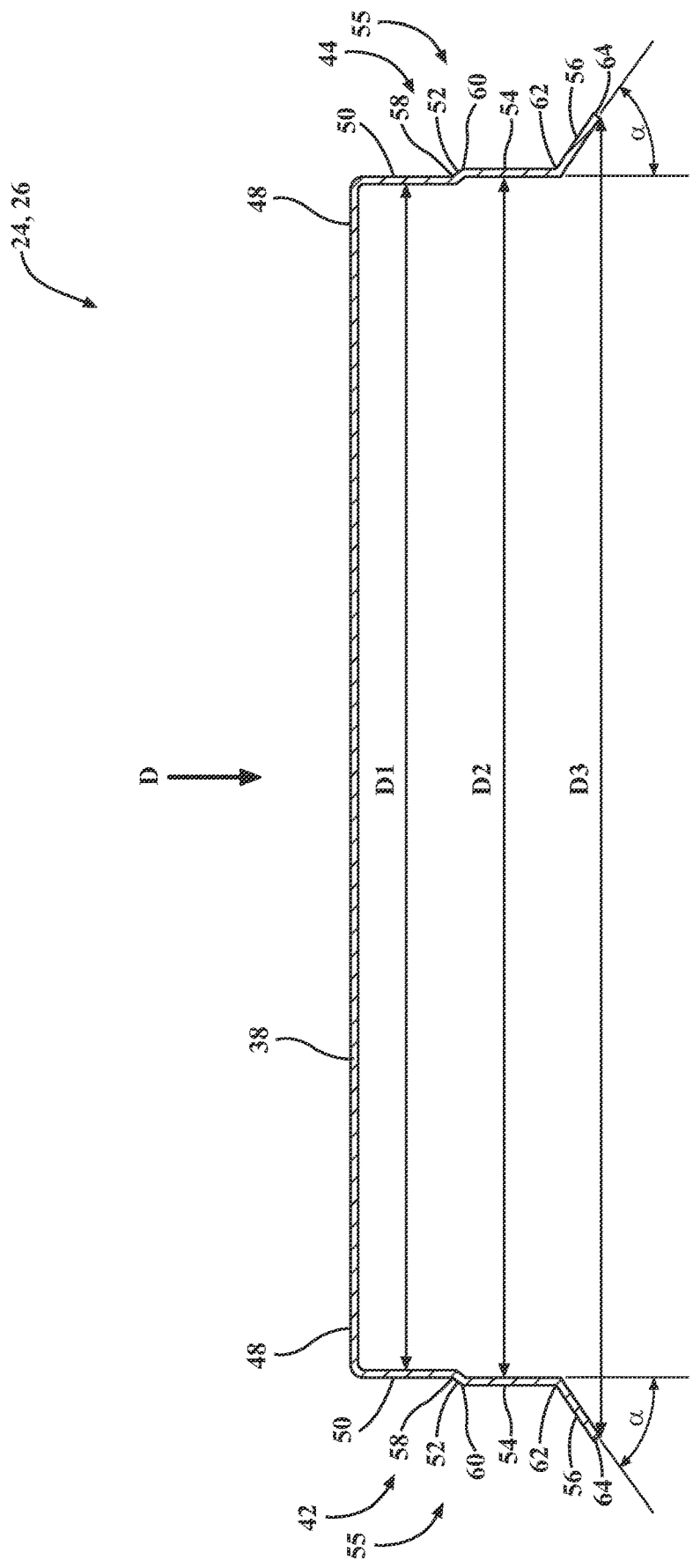
FIG. 4 is a cross-sectional view taken along line 4-4 of FIG. 3

With reference to FIG. 4, a cross-sectional view of the cell frame 24, 26 is illustrated. The first side member 42 and second side member 44 of the cell frames 24, 26 include a first segment 50, an intermediate segment 52, a second segment 54 and a fin 56. The first segment 50 extends away from the peripheral edge 48 in the direction D to a first segment edge 58 of the first segment 50. The intermediate segment 52 extends away from the first segment edge 58 in a direction transverse to the direction D to an intermediate edge 60 of the intermediate segment 52. The second segment 54 extends from the intermediate edge 60 in the direction D to a second segment edge 62 of the second segment 54. The fin 56 extends away from the second segment edge 62 at a predetermined angle α relative to the direction D to a fin edge 64 of the fin 56, as shown in FIG. 4. The predetermined angle α is considered an optimum angle to facilitate heat transfer, e.g., 45 degrees. The first segment 50, the intermediate segment 52, and the second segment 54 together form an outer peripheral 55 of the cell frame 24, 26.

As shown in FIG. 4, a distance D1 is defined to be between first segments 50 of the first side member 42 and second side member 44. A distance D2 is defined to be between the second segments 54 of the first side member 42 and the second side member 44. A distance D3 is defined to be between the fin edge 64 of the first side member 42 and the fin edge 64 of the second side member 44. The distance D1 is less than D2, and the distance D2 is less than D3. In other words, D1<D2<D3.

With reference again to FIG. 3, the bottom member 40 may have an identical structure as the first side member 42 and second side member 44. However, the bottom member 40 may not include a fin 56. For example, FIG. 3 shows the bottom member 40 without a fin 56. A distance D4 is defined to be between the top edge 46 to the bottom member 40 along the first segment 50. A distance D5 is defined to be between the top edge 46 and the second segment 54 of the bottom member 40. The distance D4 may be less than the distance D5. It should be appreciated that cell frame 24 and/or cell frame 26 may not include bottom member 40 or portions thereof.

With continued reference to FIG. 3, is should be appreciated that the fin 56 may not extend the entire distance between the top edge 46 and the bottom member 40. For example, the fin 56 in FIG. 3 does not extend the entire distance from the top edge 46 to the bottom member 40, i.e., the length of the fin 56 are less than distance D5.

Figure 5A:
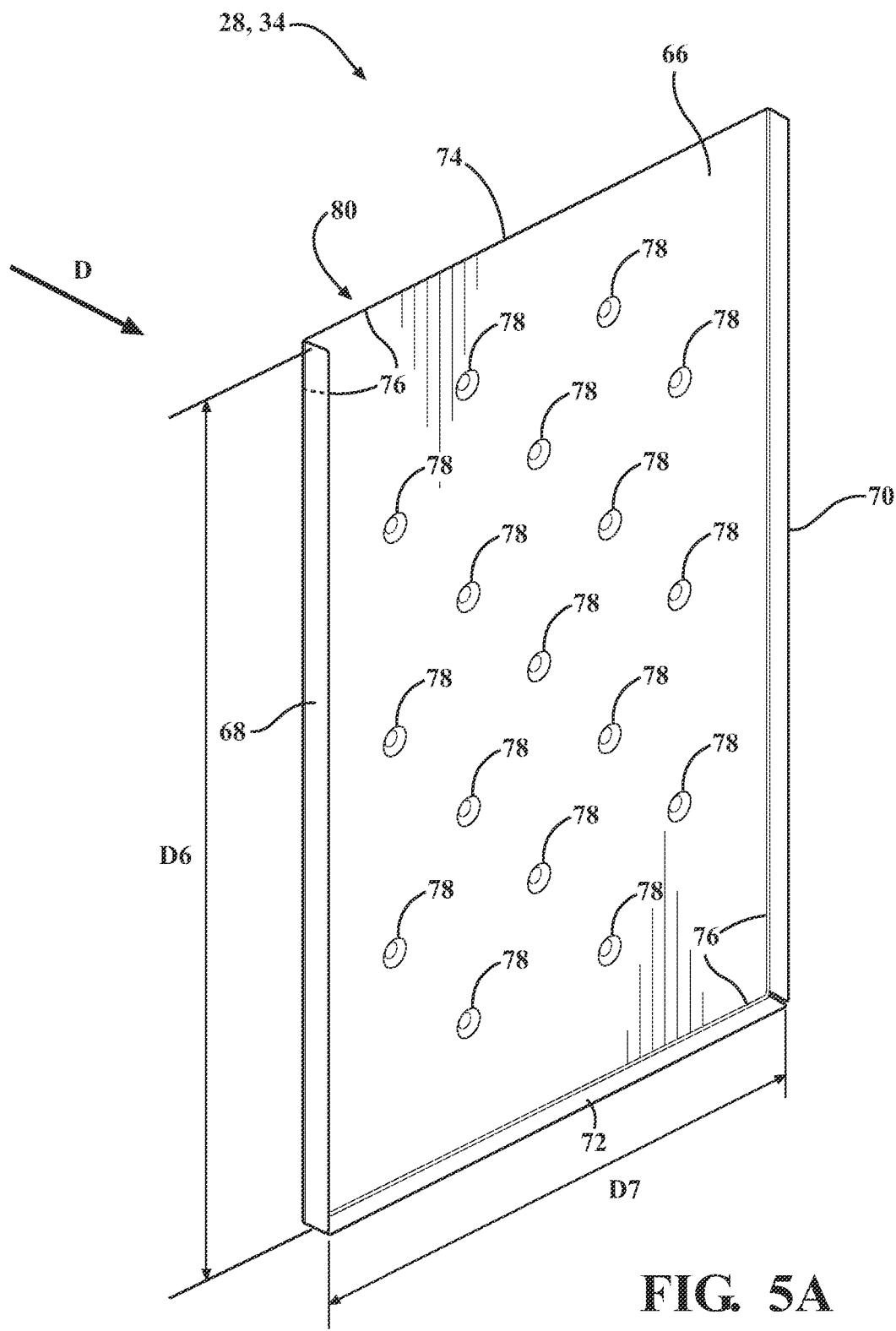
FIG. 5A is a perspective view of a growth plate having uniform spacing features.

An exemplary growth plate 28 is illustrated in FIG. 5A. The growth plate 28 includes a flex plate 66, a first side 68, a second side 70, and a bottom side 72. The bottom side 72 is spaced from a top edge 74 of flex plate 66 and extends away from a peripheral edge 76 of flex plate 66 in the direction D. The first side 68 extends away from the peripheral edge 76 in the direction D. The first side 68 extends transversely relative to the bottom side 72 between the bottom side 72 and the top edge 74 of flex plate 66. The second side 70 is spaced from the first side 68 and extends away from the peripheral edge 76 of flex plate 66 in the direction D. The second side 70 extends transversely relative to the bottom side 72 between the bottom side 72 and the top edge 74 of flex plate 66. Alternatively, in one embodiment, the growth plate 28 may not include the first side 68, the second side 70 and/or the bottom side 72.

The flex plate 66 may include spacing features 78, for example, dimples, indentations, depressions, attached cutouts, etc. The spacing features 78 are disposed about a face 80 of the flex plate 66 and protrude away from the face 80. The spacing features 78 may be formed onto the face 80 by, e.g., stamping, punching, a machine press, etc. The primary purpose of the spacing features 78 is to offset the growth plate 28 from the cell frame 24, as discussed in greater detail below. The spacing features 78 may be uniformly disposed about the face 80, as shown in FIG. 5A.

The growth plate 28 is designed to be completely received by the cell frame 24. Therefore, a distance D7, which is defined to be between the first side 68 of the growth plate 28 and the second side 70 of the growth plate 28, is less than D1 (FIG. 4). Additionally, a distance D6, which is defined to be between the top edge 74 of flex plate 66 and the bottom side 72 along the first side 68, is less than the distance D4 (FIG. 3).

For example, the first side 68, the second side 70, and the bottom side 72 of the growth plate 28 all extend from the peripheral edge 76 of the flex plate 66 to a common plane in the direction D. The common plane is parallel to the flex plate 66. The distance between the common plane and the flex plate 66 along the direction D may be less than or equal to the distance between the plate 38 of cell frame 24 and the first segment edge 58 of cell frame 24 along the direction D, for example, as shown in FIGS. 3-5.

The cell frames 24, 26 and the growth plate 28 may be formed of any suitable thermally conductive metallic material such as aluminum, copper, steel or other thermally conductive materials known to those skilled in the art. The cell frame 24, the cell frame 26 and the growth plate may each be formed of different materials.

Figure 6:
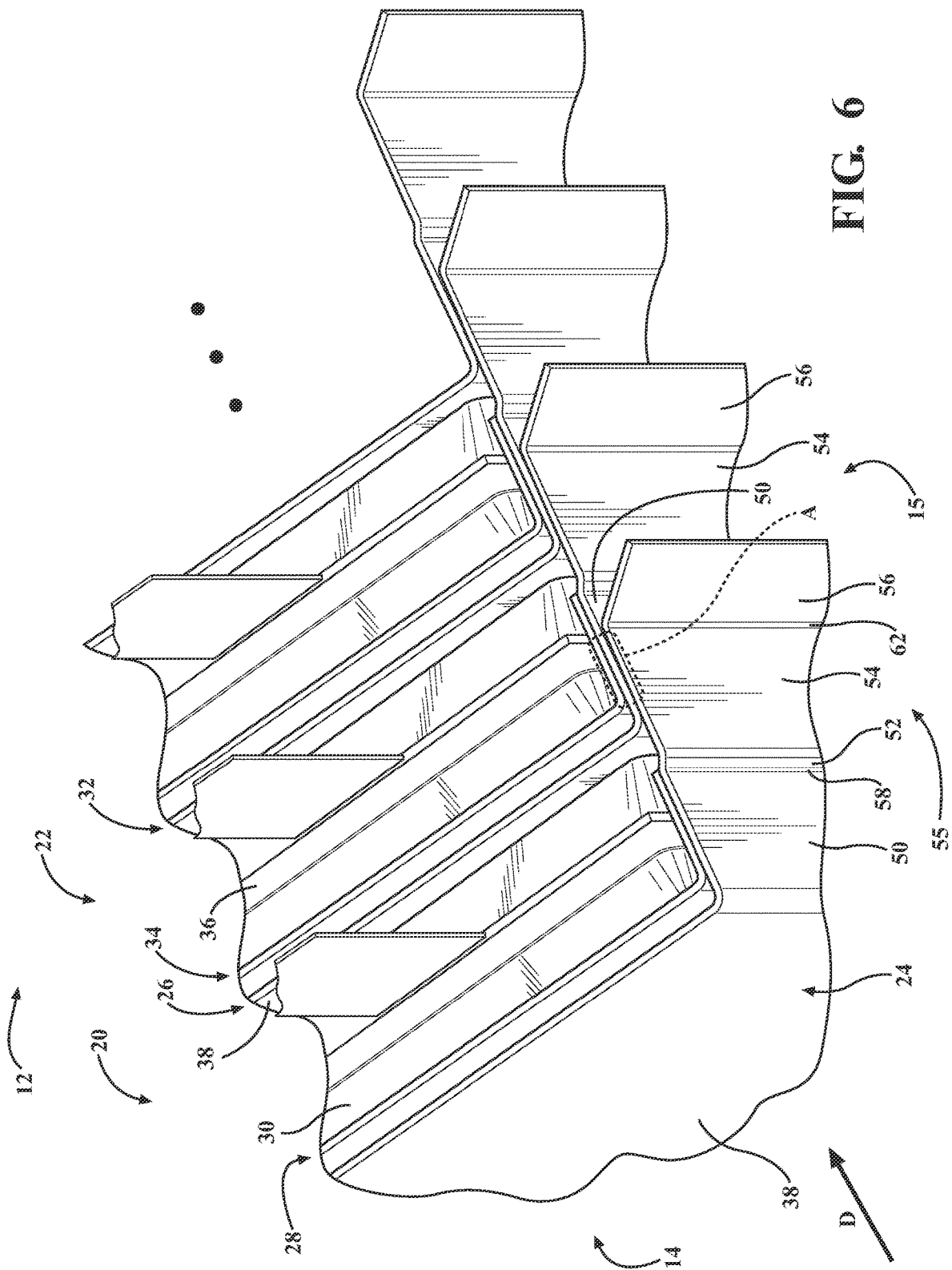
FIG. 6 is perspective view of a first portion of the battery module of FIG. 1.

With reference to FIG. 6, the first portion 12 of the battery module 10 is illustrated. The first portion 12 may contain more than two battery cell assemblies. For example, three battery cell assemblies are shown in FIG. 6: the battery cell assemblies 20, 22, and the second battery cell assembly 22 that is repeated (not numbered). As described below, a battery module 10 having more than five battery cells will have repeated second battery cell assemblies 22.

An explanation of how portions of the cell frames 24, 26 are coupled together will be provided before explaining the coupling together of the cell frames 24, 26 in their entirety. As shown in FIG. 6, for example, the first segment 50 of cell frame 26 is received entirely by the second segment 54 of cell frame 24. This is because the distance D1 and D4 of cell frame 26 are less than the distance D2 and D5 of cell frame 24, respectively. It should be noted that a plane formed by the plate 38 of cell frame 26 may intersect any point on the second segment 54 of the cell frame 24 or any point on the intermediate segment 52 of the cell frame 24 along the direction D between the first segment edge 58 and the second segment edge 62 of the cell frame 24. The location of the plane along the second segment 54 or the intermediate segment 52 at least depends on how much pressure is applied to the battery cell 30, as described below.

Referring to FIGS. 2 and 6, the first battery cell assembly 20 is coupled together by disposing the battery cell 30 and the growth plate 28 between the cell frame 24 and cell frame 26. The cell frames 24, 26 are positioned adjacent to one another such that the second segment 54 of cell frame 24 encloses at least a portion of the first segment 50 of cell frame 26. Cell frame 26 is then moved, i.e., pressed, toward the battery cell 30 until a predetermined pressure, e.g., 10 to 50 pounds per square inch, along on the battery cell 30 is achieved. In other words, a portion of the outer peripheral 55 of the cell frame 26, the growth plate 28 and the battery cell 30 are disposed within the outer peripheral 55 of the cell frame 24. For example, cell frame 26 is moved toward battery cell 30 by a stack welding fixture, welding press, etc. The predetermined pressure, e.g., 10 to 50 pounds per square inch, applied along the battery cell 30 may be uniform about faces 82 of the battery cell 30. Specifically, the distance between plate 38 of cell frame 24 and plate 38 of cell frame 26 may be equidistant. It should be appreciated that the growth plate 28 of first battery cell assembly 20 may be installed and secured into cell frame 24 prior to the assembly of first battery cell assembly 20.

Once the predetermined pressure along the faces 82 of the battery cell 30 is achieved, cell frame 24 and cell frame 26 may be permanently joined or bonded, i.e., fixedly coupled, together by, for example, techniques, such as laser welding, electric resistance welding (ERW), gas metal arc welding (GMAW), ultrasonic metal welding, etc. For example, the cell frames 24, 26 may be welded together along the first side 15 and second side 17 of the battery module 10 in an overlap zone A where the first segment 50 of cell frame 26 overlaps the second segment 54 of cell frame 24, as shown in FIG. 6. It should be appreciated that the thermal conductivity of the cell frames 24, 26, i.e., the thermal conductivity path from the battery cell 30 through the cell frames 24, 26 and growth plate 28 to the fin 56, may increase as the amount of bonding locations increase.

Alternatively, the cell frames 24, 26 may be coupled together along the first side 15 and second side 17 of the battery module 10 in the overlap zone A by, for example, a fastening technique, such as screws, rivets, etc. The fastening technique may allow for deconstruction and reconstruction of the cell frames 24, 26.

Figure 7:
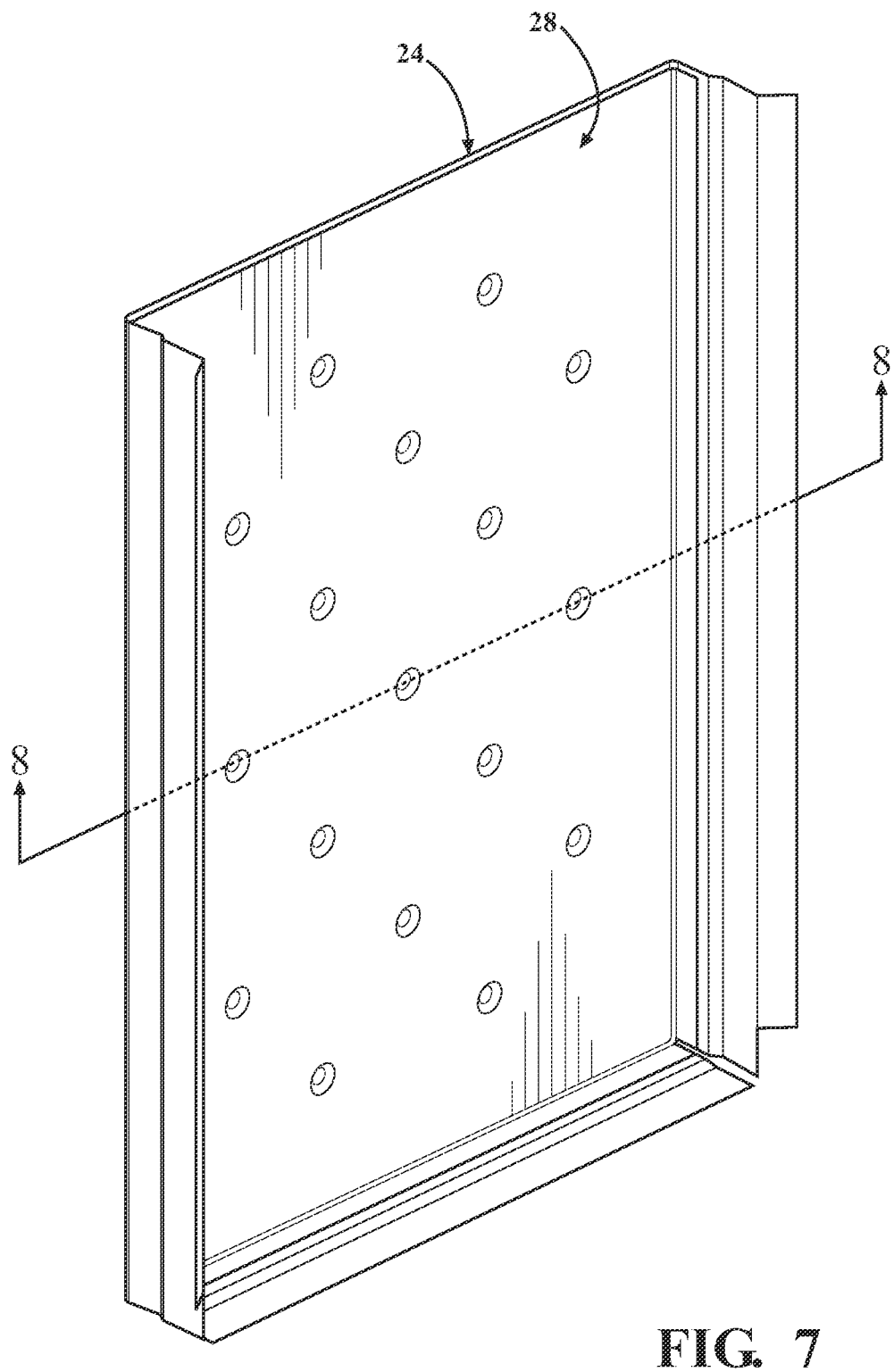
FIG. 7 is a perspective view of the growth plate of FIG. 5A disposed within the cell frame of FIG. 3.

As shown in FIG. 7, the growth plate 28 of FIG. 5A is disposed within the cell frame 24 of FIG. 3. The growth plate 28 may be coupled to the cell frame 24 prior to the first battery cell assembly 20 being coupled together, as set forth below.

Figure 5B:
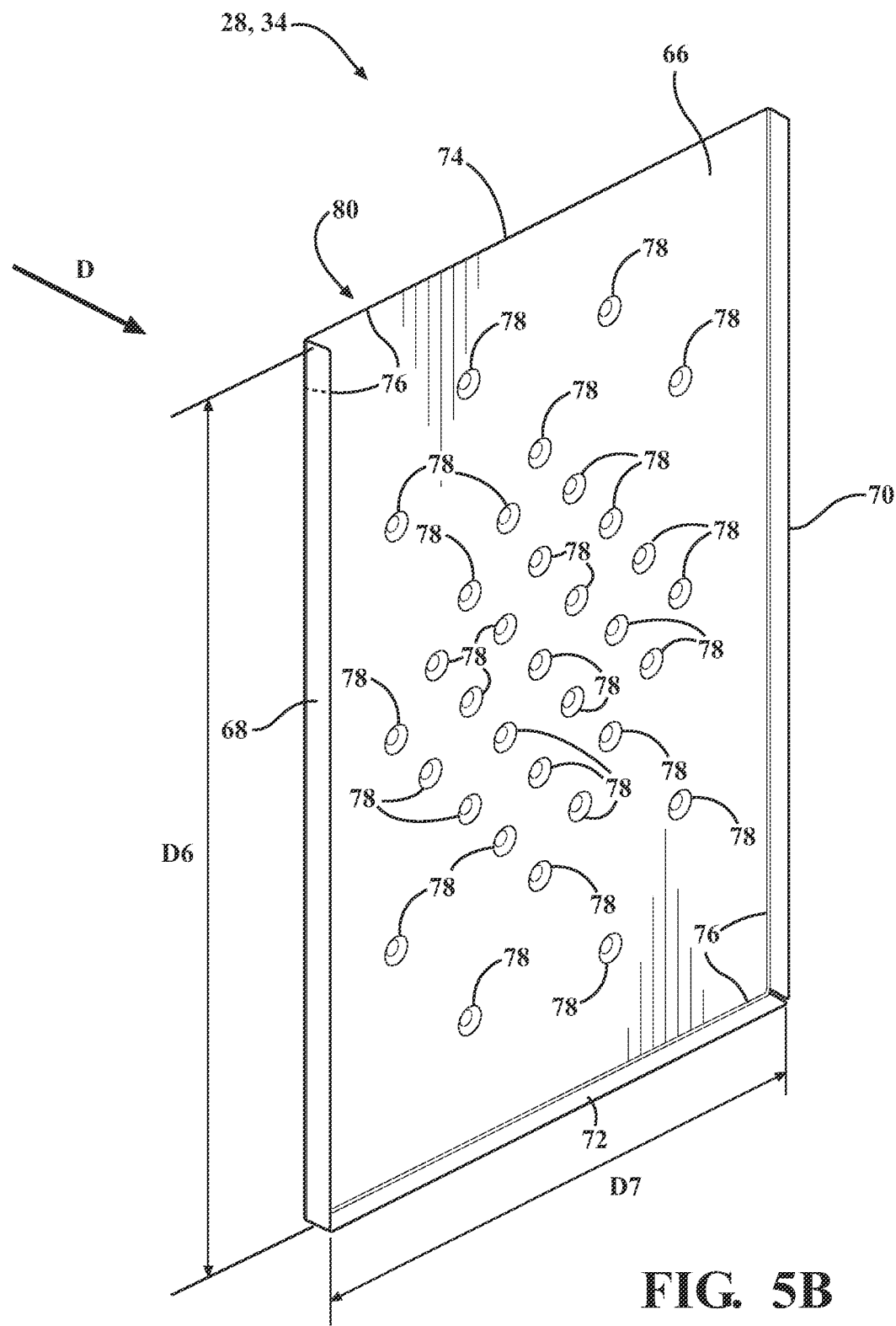
FIG. 5B is a perspective view of a growth plate having nonuniform spacing features.
Figure 8:
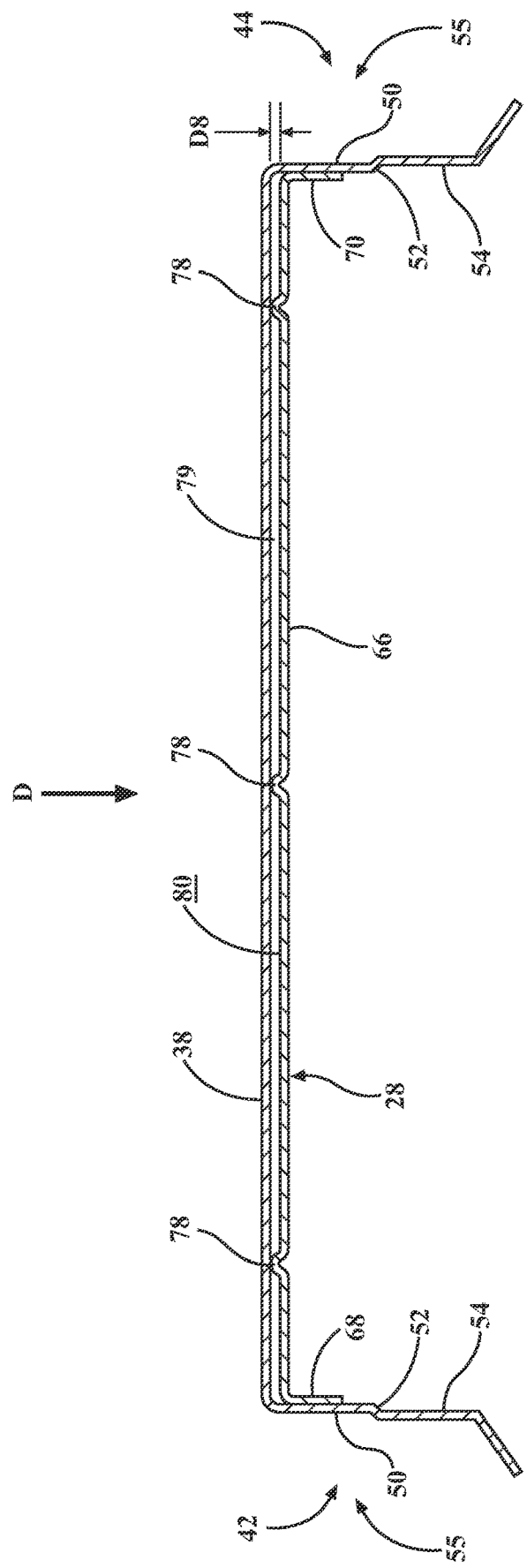
FIG. 8 is a cross-sectional view taken along line 8-8 of FIG. 7.

Referring to FIG. 8, a cross-sectional view taken along a middle of the combination of the growth plate 28 and cell frame 24 along the direction D is shown. As set forth above, the spacing features 78 protruding from the face 80 of the flex plate 66 cause the growth plate 28 to be offset from the plate 38 of cell frame 24 by a distance D8. The spacing features 78 are preferably deformable to give compliancy to the flex plate 66 of the growth plate 28 and allow the battery cell 30 to expand toward the plate 38 of the cell frame 24 while applying a uniform pressure, e.g., 10-50 pounds per square inch, along the faces 82 of the battery cell 30 over its operational life. In other words, the spacing features 78 offset the flex plate 66 from the plate 38 of cell frame 24 creating a cavity 79 that decreases when the battery cell 30 expands. The spacing features 78 may be any suitable shape, length and/or depth that allow the growth plate 28 to be offset from the cell frame 24. In other words, the spacing features 78 may be any suitable type of feature that creates a compliant standoff and deforms to allow for battery cell growth. The effective spring force generated by the spacing features 78 and the flex plate 66 may be controlled by varying, for example, the number of spacing features 78, the depth of the spacing features 78, the pitch of the spacing features 78, the pattern of the spacing features 78, the shape of the spacing features 78, etc. By varying one or more spacing features 78, a compliancy profile may be generated across the face 80 of the flex plate 66. For example, spacing of the spacing features 78 along the face 80 of the flex plate 66 may be nonuniform and the spring force of the flex plate 66 may have vary across the face 80 of the flex plate 66. For example, as shown in FIG. 5B, the density of spacing features 78 is greater toward a middle of the face 80. The spacing of the spacing features 78 may be configured to provide uniform pressures along the faces 82 of the battery cell 30 over the operational life of the battery cell 30.

To increase the thermal conductivity of the first battery cell assembly 20, the growth plate 28 may, for example, be coupled to the cell frame 24 using techniques as described above. More specifically, for example, the first side 68, second side 70, and/or the bottom side 72 may be welded to the first segment 50 of cell frame 24. Additionally, or in the alternative, for example, the spacing features 78 may be welded to the cell frame 24. As yet another alternative, for example, the first battery cell assembly 20 may include a thermally conductive pad (not shown) sandwiched between the growth plate 28 and the cell frame 24.

The battery cell 30, 36 may be, for example, a lithium-ion pouch-type battery cell, prismatic-type battery cell, etc. Other types of battery cells known to those skilled in the art may be utilized.

Figure 9:
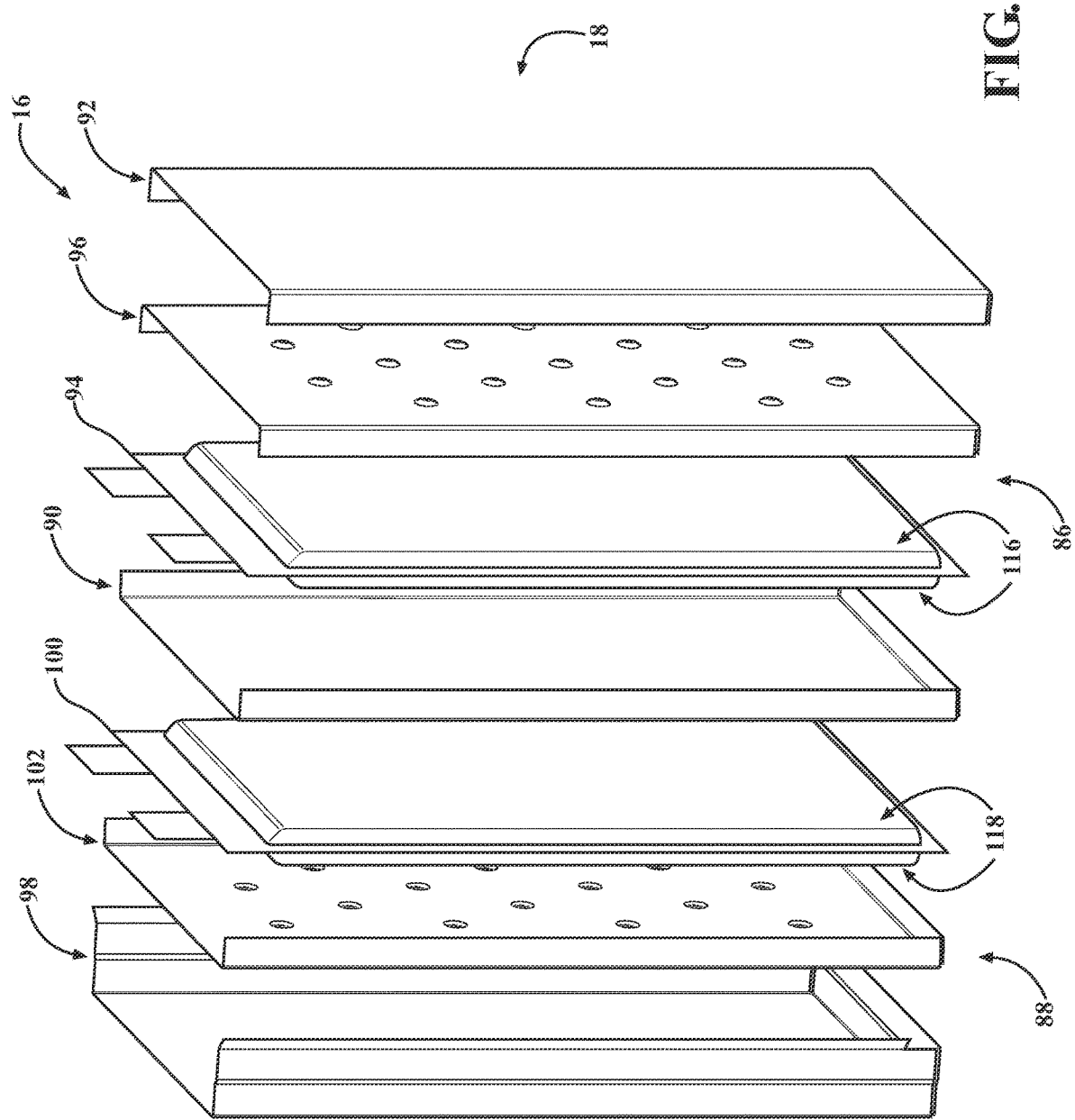
FIG. 9 is an exploded perspective view of two battery cell assemblies at a terminating end of the battery module of FIG. 1.

With reference to FIG. 9, two battery cell assemblies are illustrated in an exploded view at the terminating end 18 (FIG. 1) of the battery module 10. The terminating portion 16 (FIG. 1) of battery module 10 includes a terminating battery cell assembly 86 and an intermediate battery cell assembly 88. The terminating battery cell assembly 86 includes terminating cell frames 90, 92, battery cell 94, and growth plate 96. The intermediate battery cell assembly 88 includes terminating cell frame 90, intermediate cell frame 98, battery cell 100, and growth plate 102. The terminating battery cell assembly 86 and the intermediate battery cell assembly 88 share the terminating cell frame 90. Terminating cell frame 90 has an identical structure as terminating cell frame 92. The growth plates 96, 102 have identical structures as growth plate 28 (FIGS. 5A-5B). The intermediate cell frame 98 has an identical structure as cell frames 24, 26, 32 of the battery cell assemblies 20, 22, respectively. Common numerals are used to identify common features. Alternatively, the growth plate 96 may be rotated and placed between terminating cell frame 90 and battery cell 94.

Figure 10:
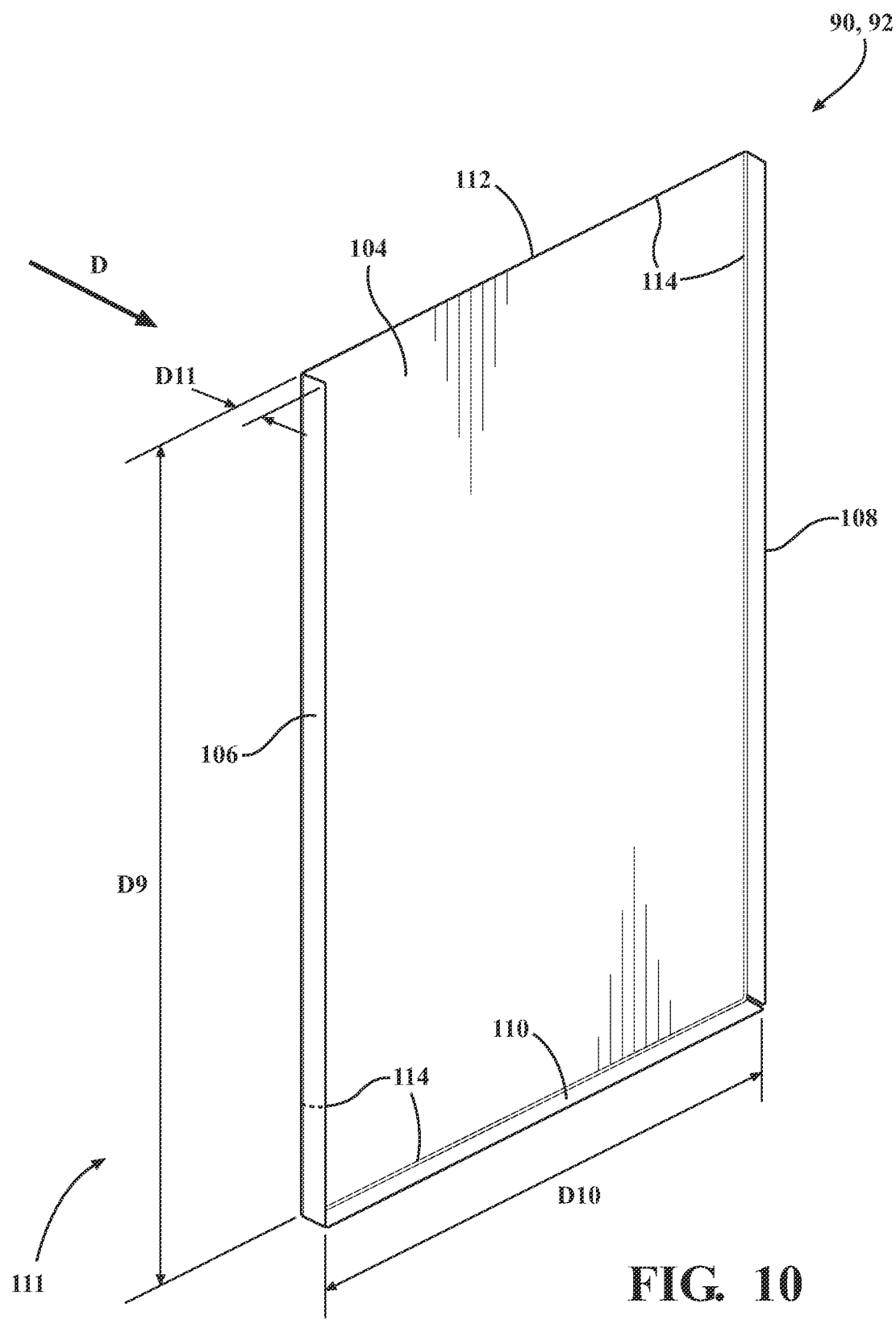
FIG. 10 is a perspective view of a terminating cell frame.

With reference to FIG. 10, the terminating cell frames are illustrated. The terminating cell frames 90, 92 include a plate 104, a first side 106, a second side 108, and a bottom side 110. The bottom side 110 is spaced from a top edge 112 of the plate 104 and extends away from a peripheral edge 114 of the plate 104 in the direction D. The first side 106 extends away from the peripheral edge 114 in the direction D. The first side 106 extends transversely relative to the bottom side 110 between the bottom side 110 and the top edge 112. The second side 108 is spaced from the first side 106 and extends away from the peripheral edge 114 in the direction D. The second side 108 extends transversely relative to the bottom side 110 between the bottom side 110 and the top edge 112. The first side 106, the second side 108, and the bottom side 110 together form an outer peripheral 111 of the cell frames 90, 92. It should be appreciated that terminating cell frames 90, 92 may not include the bottom side 110, and/or intermediate cell frame 98 may not include bottom member 40 or portions thereof.

A distance D9 is defined to be between the peripheral edge 114 adjacent to the bottom side 110 and the top edge 112. A distance D10 is defined to be between the first side 106 and the second side 108. The first side 106, the second side 108, and the bottom side 110 extend away from the peripheral edge 114 to a common terminating plane along the direction D. A distance D11 is defined to be the distance between the plate 104 and the common terminating plane along the direction D. It should be noted that the distance D10 for terminating cell frame 90 and terminating cell frame 92 may be different.

Figure 11:
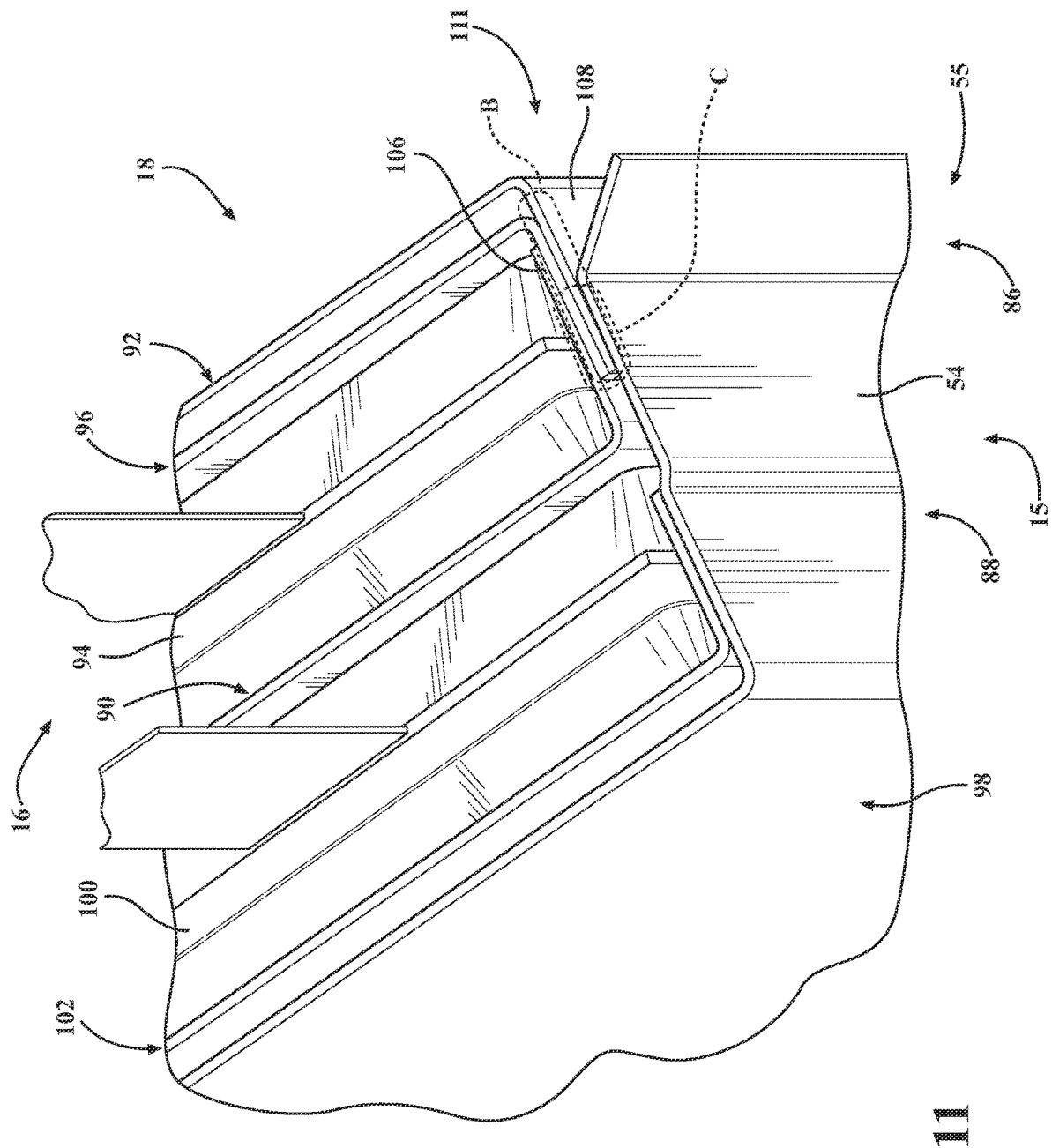
FIG. 11 is a perspective view of a terminating portion of the battery module of FIG. 1.

With reference to FIG. 11, the terminating portion 16 of the battery module 10 is illustrated. The terminating cell frame 92 is designed to receive both the growth plate 96, the battery cell 94 and terminating cell frame 92 when coupled together. In other words, for example, a portion of the outer peripheral 111 of the terminating cell frame 90, the growth plate 96 and a portion of the battery cell 94 are disposed within the outer peripheral 111 of the terminating cell frame 92. In similar fashion, growth plate 96 receives the terminating cell frame 90. For this "nesting" to occur, for example, the distances D9 and D10 of terminating cell frame 90 are less than the distances D6 and D7 of growth plate 96, respectively, and the distances D6 and D7 of growth plate 96 are less than the distance D9 and D10 of terminating cell frame 92, respectively. Alternatively, the nesting can be accomplished by having growth plate 96 installed between terminating cell frame 90 and battery cell 94 where the terminating cell frame 90 receives growth plate 96, and growth plate 96 receives terminating cell frame 92. As yet another alternative, the nesting can be accomplished by having growth plate 96 installed between terminating cell frame 90 and battery cell 94 where and terminating cell frame 90 receives growth plate 96, and terminating cell frame 92 receives terminating cell frame 90.

Referring to FIGS. 9-11, an explanation of how portions of the terminating battery cell assembly 86 are coupled together will be provided before explaining the coupling together of the terminating battery cell assembly 86 and intermediate battery cell assembly 88 in their entirety. As shown, for example, the terminating battery cell assembly 86 is coupled together by disposing the battery cell 94 and the growth plate 96 between the terminating cell frames 90, 92. The terminating cell frames 90, 92 are positioned adjacent to one another such that first side 106 of the terminating cell frame 90 overlaps with the second side 108 of terminating cell frame 92. The terminating cell frames 90, 92 are moved toward each other until a predetermined pressure, e.g., 10 to 50 pounds per square inch, along the battery cell 94 is achieved. The terminating cell frames 90, 92 are moved, i.e., pressed, together, for example, by a stack welding fixture, welding press, etc. The predetermined pressure, e.g., 10 to 50 pounds per square inch, applied along the battery cell 94 may be uniform about faces 116 of the battery cell 94. Specifically, the distance between plate 104 of terminating cell frame 90 and plate 104 of terminating cell frame 92 may be equidistant. It should be appreciated that the growth plate 96 may be installed into either terminating cell frame 90, or terminating cell frame 92 prior to the assembly of terminating battery cell assembly 86. To increase the thermal conductivity of terminating battery cell assembly 86, the growth plate 96 may be coupled, e.g., welded, to either terminating cell frame 90, or terminating cell frame 92 in a similar manner as described above prior to the assembly of the terminating battery cell assembly 86.

Once the predetermined pressure along the faces 116 of the battery cell 94 is achieved, terminating cell frame 90 and terminating cell frame 92 may be permanently joined or bonded, i.e., fixedly coupled, together by, e.g., techniques described above. For example, the terminating cell frames 90, 92 are welded together along the first and second sides 15, 17 of the battery module 10 in an overlap zone B where the first side 106 of terminating cell frame 90 overlaps the second side 108 of terminating cell frame 92, as shown in FIG. 11.

Alternatively, the terminating cell frames 90, 92 may be coupled together along the first side 15 and second side 17 of the battery module 10 in the overlap zone B by, for example, a fastening technique, such as screws, rivets, etc. The fastening technique may allow for deconstruction and reconstruction of the terminating cell frames 90, 92.

Next, the terminating battery cell assembly 86 is then received by intermediate cell frame 98. The nesting is made possible due to the distances D10 and D9 of terminating cell frame 90 being less than the distances D2 and D5 of intermediate cell frame 98, respectively. As shown, for example in FIG. 11, the terminating battery cell assembly 86 and the intermediate battery cell assembly 88 are coupled together by disposing the battery cell 100 and the growth plate 102 between the terminating battery cell assembly 86 and intermediate cell frame 98. The terminating battery cell assembly 86 and the intermediate cell frame 98 are positioned adjacent to one another such that the second segment 54 of intermediate cell frame 98 encloses at least a portion of the first side 106 of terminating cell frame 90. The terminating battery cell assembly 86 and the intermediate cell frame 98 are moved toward each other until a predetermined pressure, e.g., 10 to 50 pounds per square inch, along the battery cell 100 is achieved. In other words, for example, a portion of the outer peripheral 111 of the terminating cell frame 92, the growth plate 102 and the battery cell 100 are disposed within the outer peripheral 55 of the intermediate cell frame 98. The terminating battery cell assembly 86 and the intermediate cell frame 98 are moved, i.e., pressed, together, for example, by a stack welding fixture, welding press, etc. The predetermined pressure, e.g., 10 to 50 pounds per square inch, applied along the battery cell 100 may be uniform about faces 118 of the battery cell 100. Specifically, the distance between plate 104 of terminating cell frame 90 and plate 38 of intermediate cell frame 98 may be equidistant. It should be appreciated that the growth plate 102 may be installed into intermediate cell frame 98 prior to the assembly of intermediate battery cell assembly 88. To increase the thermal conductivity of intermediate battery cell assembly 88, the growth plate 102 may be, e.g., welded, to the intermediate cell frame 98 in a similar manner as set forth above.

Once the predetermined pressure along the faces 118 of the battery cell 100 is achieved, intermediate cell frame 98 and terminating battery cell assembly 86 may be permanently joined or bonded together, i.e., fixedly coupled, by, for example, techniques as described above. For example, the intermediate cell frame 98, the terminating cell frame 92 and/or the terminating cell frame 90 are welded together along the first and second sides 15, 17 of the battery module 10 in an overlap zone C where the second segment 54 of the intermediate cell frame 98 overlaps the second side 108 of terminating cell frame 92 and/or first side 106 of terminating cell frame 90, as shown in FIG. 11.

Alternatively, the intermediate cell frame 98, the terminating cell frame 92 and/or the terminating cell frame 90 may be coupled together along the first side 15 and second side 17 of the battery module 10 in the overlap zone C by, for example, a fastening technique, such as screws, rivets, etc. The fastening technique may allow for deconstruction and reconstruction of the intermediate cell frame 98, terminating cell frame 92 and/or terminating cell frame 90.

Alternatively, the intermediate battery cell assembly 88 and the terminating battery cell assembly 86 may be coupled together in one assembly process. For example, the terminating battery cell assembly 86 may be nested together in the various ways, as set forth above, prior to coupling, and the battery cell assemblies 86, 88 are moved, i.e., pressed, together, for example, by a stack welding fixture, welding press, etc. and bonded, i.e., fixedly coupled, together as one assembly in the overlap zone C of FIG. 11. This process eliminates the coupling process of the terminating battery cell assembly 86, as discussed above.

Referring to FIGS. 1-11, plates 38, 104 may have the same or different thicknesses from one another within battery module 10 to facilitate heat rejection. This is especially true for plate 38 at the first end 14 of the battery module 10 and plate 104 at the terminating end 18 of the battery module 10 to facilitate heat rejection when attaching the battery module 10 to other components in a battery system.

The battery module 10 may include at least the intermediate battery cell assembly 88 and the terminating battery cell assembly 86, for example, a "two-celled" battery module 10. The battery module 10 may include more than two battery cells. In this case, for example, the battery module 10 may include battery cell assemblies 20, 86, 88, i.e., a "three-celled" battery module 10, or the battery module 10 may include battery cell assemblies 20, 22, 86, and 88, i.e., a "four-celled" battery module 10, and so on with multiple instances of the second battery cell assembly 22 for larger battery modules 10. When more than two battery cells are present in the battery module 10, the intermediate cell frame 98 replaces the cell frame furthest from the first end 14 of the battery module 10. For example, and referring to FIGS. 2 and 9, intermediate cell frame 98 replaces cell frame 32 in the "four-celled" battery module 10, i.e., the second battery cell assembly 22 would include intermediate cell frame 98 instead of cell frame 32. The battery assemblies may be coupled to each other by, for example, techniques as set forth above.

Figure 12A:
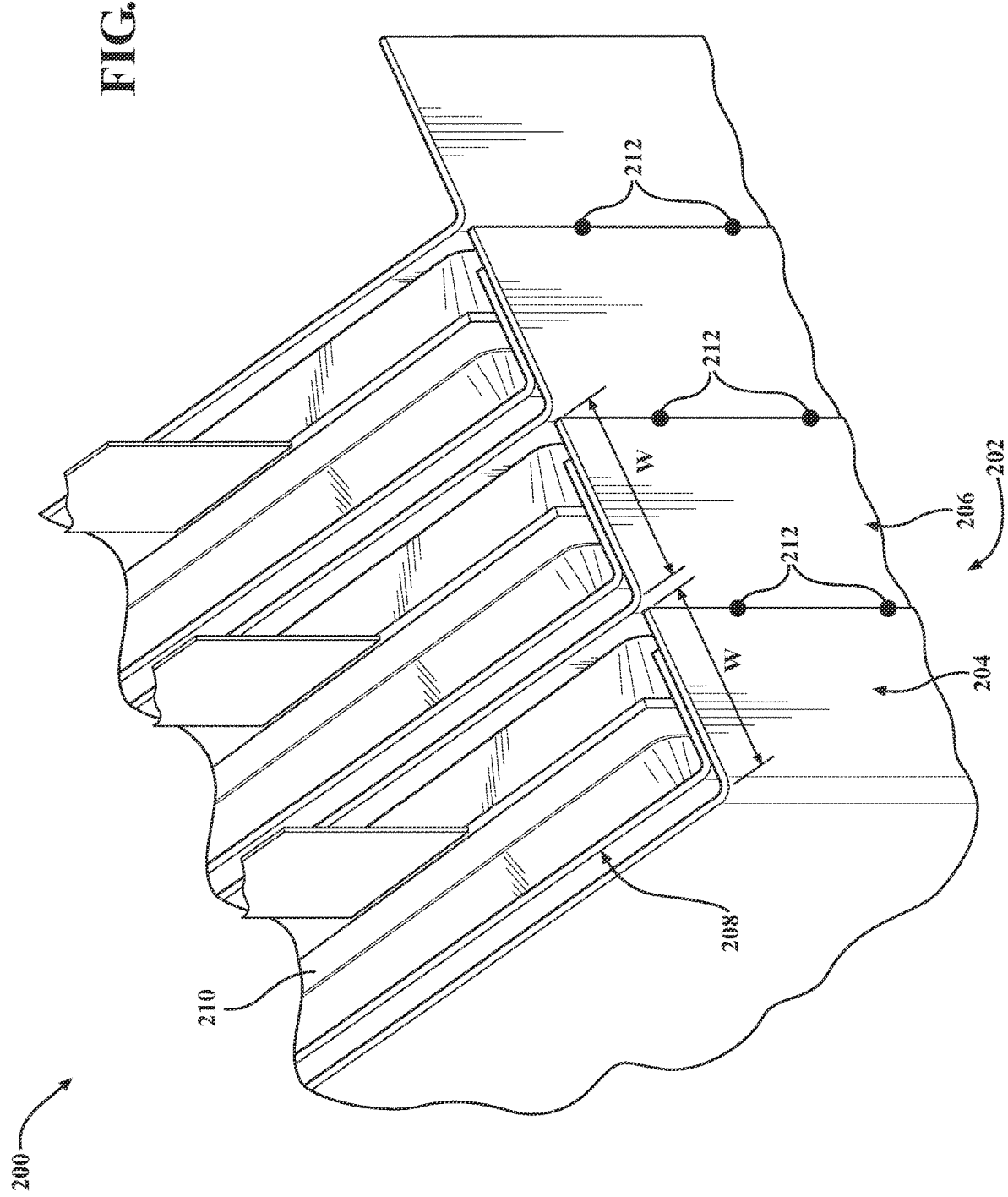
FIG. 12A is a perspective view of a portion of an example battery module showing butt welds between stack cell frames.

FIG. 12A illustrates a portion of an example battery module 200. The battery module 200 includes a stack battery cell assembly 202 having stack cell frames 204, 206. FIG. 12A includes two additional stack battery cell assemblies for illustration purposes (not numbered). The stack cell frames 204, 206 are similar to terminating cell frames 90, 92, however, no nesting occurs. Specifically, stack cell frame 204 does not receive stack cell frame 206, and stack cell frame 206 does not receive stack cell frame 204. The stack cell frames 204, 206 abut one another and are then coupled together.

The stack battery cell assembly 202 is coupled together by disposing the battery cell 210 and the growth plate 208 between the stack cell frame 204 and stack cell frame 206. The stack cell frames 204, 206 are positioned adjacent to one another. Stack cell frame 206 is then moved, i.e., pressed, toward the battery cell 210 until a predetermined pressure, e.g., 10 to 50 pounds per square inch, along the battery cell 210 is achieved. The width W of the stack cell frames 204, 206 is configured to provide the predetermined pressure on the battery cell 210 when the stack cell frames are abutted next to one another. As set forth above, the predetermined pressure, e.g., 10 to 50 pounds per square inch, applied along the battery cell 210 may be uniform about the faces of the battery cell 210, and the growth plate 208 may allow growth of the battery cell 210 during the operational life of the cell.

Once the predetermined pressure along the battery cell 210 is achieved, stack cell frames 204, 206 are coupled together by, e.g., techniques as described above. As shown in FIG. 12A, e.g., stack cell frames 204, 206 are fixedly coupled together by butt welds 212 along the interface between stack cell frames 204, 206.

Figure 12B:
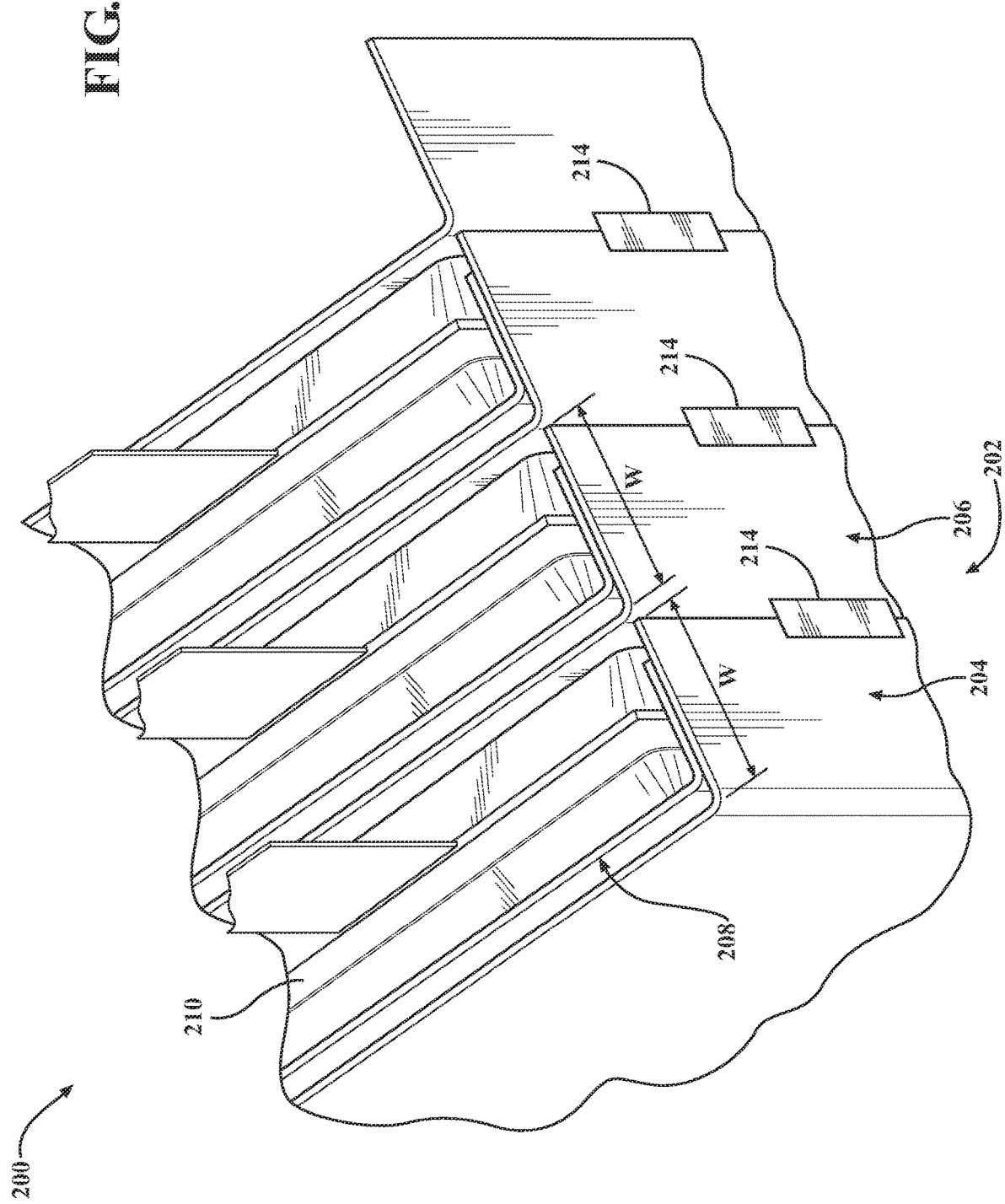
FIG. 12B is a perspective view of the battery module in FIG. 12A showing straps welded between the stack cell frames.

FIG. 12B illustrates another example configuration of the battery module 200. FIG. 12B includes two additional stack battery cell assemblies for illustration purposes (not numbered). Stack cell frames 204, 206 are coupled together by straps 214 along the interface between stack cell frames 204, 206. The straps 214 may be bonded, e.g., welded, to both stack frame cells 204, 206 to permanently bond, i.e., fixedly couple, the two stack cell frames 204, 206 together once the predetermined pressure along the faces of the battery cell 210 is achieved. The width W of the stack cell frames 204, 206 is configured to provide the predetermined pressure on the battery cell 210 when the stack cell frames are abutted next to one another.

Furthermore, the stack cell frames 204, 206 may be coupled, e.g., fixedly, mechanically, etc., or bonded together by any suitable technique known to those skilled in the art.

Figure 13:
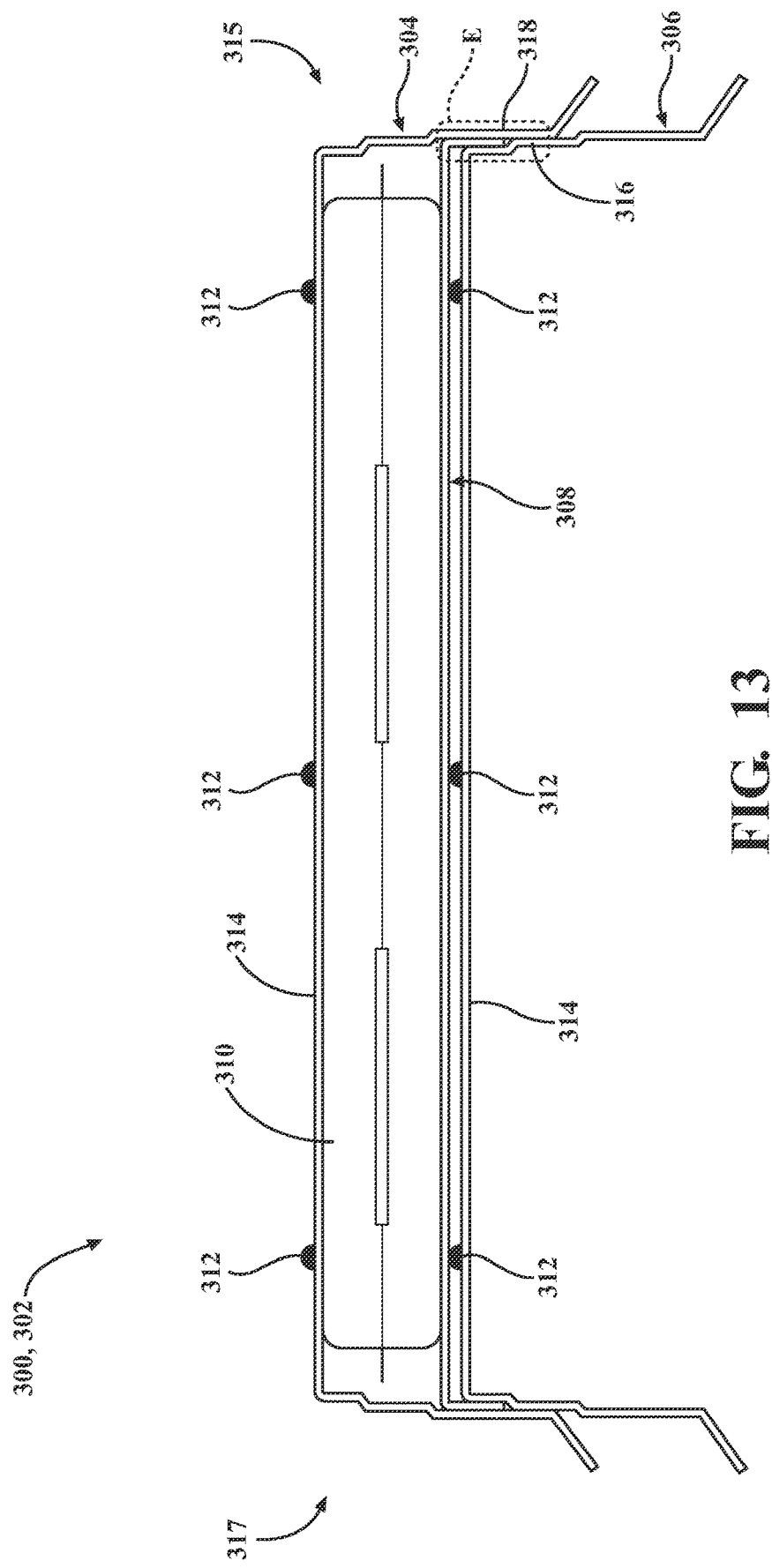
FIG. 13 is a cross-sectional view of a portion of an example battery module.

With reference to FIG. 13, a cross-sectional view of a portion of an example battery module 300 is shown. A flex cell frame 304 and a flex cell frame 306 are identical and similar to cell frames 24, 26, however spacing features 312 are formed on the flex cell frames 304, 306. Specifically, an offset plate 308 is configured not to flex, and a plate 314 of flex cell frames 304, 306 contain the spacing features 312 that provides compliancy to the plates 314 allowing the battery cell 310 to expand during the operational life of the battery cell 310. The compliancy provided by the spacing features 312 is similar in form and function as described above for spacing features 78.

A flex battery cell assembly 302 is coupled together by disposing the battery cell 310 and the offset plate 308 between the flex cell frame 304, 306. The flex cell frames 304, 306 are positioned adjacent to one another such that a second segment 318 of flex cell frame 304 encloses at least a portion of a first segment 316 of flex cell frame 306. Flex cell frame 306 is then moved, i.e., pressed, toward the battery cell 310 until a predetermined pressure, e.g., 10 to 50 pounds per square inch, along the battery cell 310 is achieved. For example, flex cell frame 306 is moved toward battery cell 310 by a stack welding fixture, welding press, etc. The predetermined pressure, e.g., 10 to 50 pounds per square inch, applied along the battery cell 310 may be uniform about the battery cell 310. Specifically, the distance between plate 314 of flex cell frame 304 and plate 314 of flex cell frame 306 may be equidistant. It should be appreciated that the offset plate 308 may be installed and secured onto flex cell frame 306 prior to the assembly of flex battery cell assembly 302. The offset plate 308 may be coupled to the flex cell frame 306 using, for example, techniques described above.

Once the predetermined pressure, e.g., 10-50 pounds per square inch, along the battery cell 310 is achieved, flex cell frames 304, 306 may be permanently joined or bonded, i.e., fixedly coupled, together by, e.g., techniques as described above. For example, the flex cell frames 304, 306 are welded together along a first side 315 and a second side 317 of the battery module 300 in an overlap zone E where the first segment 316 of flex cell frame 306 and/or offset plate 308 overlap the second segment 318 of flex cell frame 304, as shown in FIG. 13.

Alternatively, the flex cell frames 304, 306 may be coupled together along the first side 315 and second side 317 of the battery module 300 in the overlap zone E by, for example, a fastening technique, such as screws, rivets, etc. The fastening technique may allow for deconstruction and reconstruction of the flex cell frames 304, 306.

Figure 14:
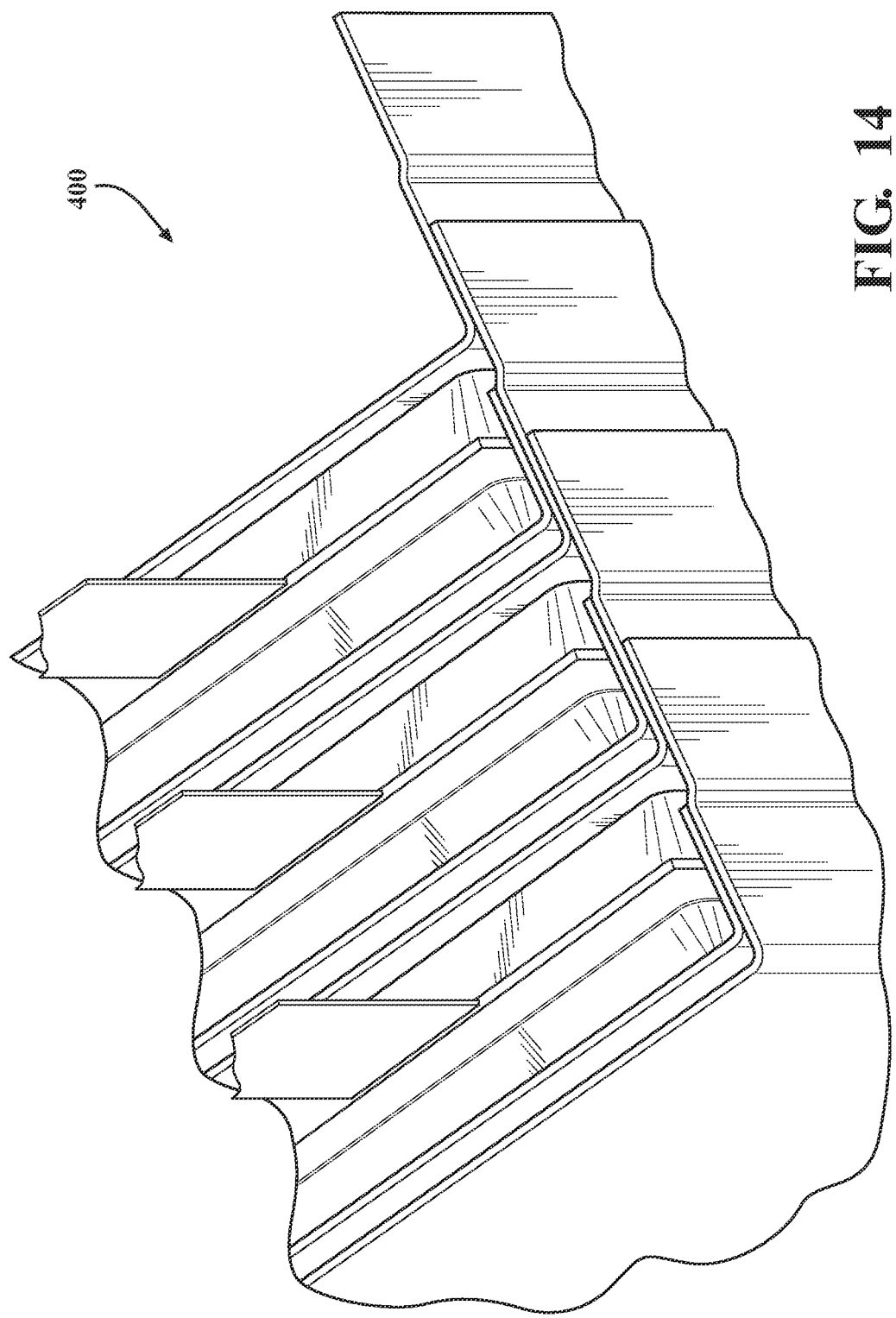
FIG. 14 is a perspective view of another example battery module.
Figure 15:
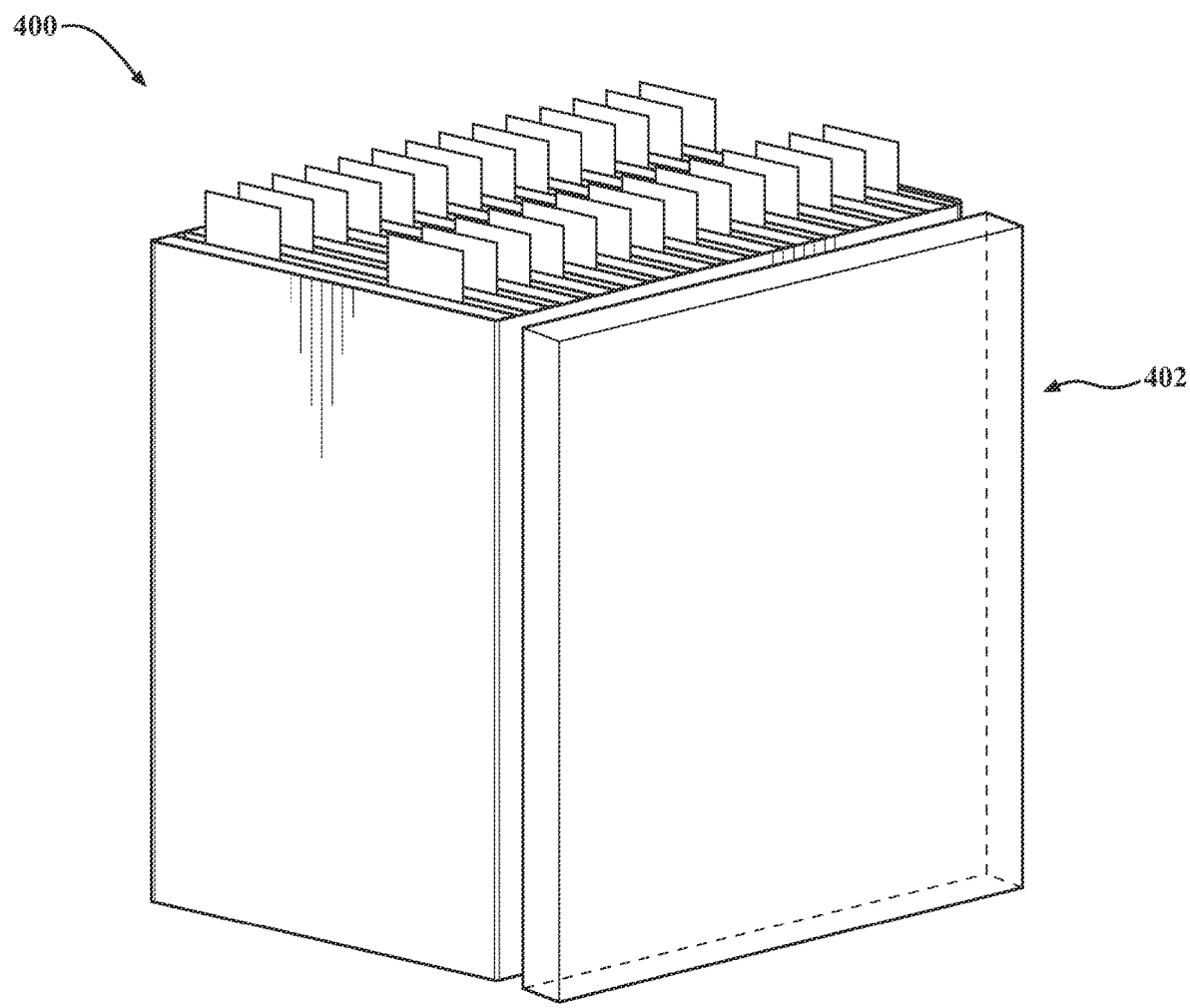
FIG. 15 is a perspective view the battery module of FIG. 14 with an external heat sink.

Referring to FIGS. 14 and 15, an example battery module 400 is illustrated. The battery module 400 is similar to the battery module 10 (see FIG. 6) except that the battery module 400 does not contain fins 56.

The battery module 400 may be coupled to a heat exchanger 402 external to the battery module 400, for example, as shown in FIG. 15. The heat exchanger 402 may be a passive heat sink or actively (externally) cooled in order to draw out heat from the battery module 400. Air gaps may exist between the battery module 400 and the heat exchanger. A thermally conductive pad (not shown) may be sandwiched between the battery module 400 and the heat exchanger 402 to increase the thermal conductivity due to the air gaps. It should be appreciated that battery module 400 could contain fins 56 on the side opposite the heat exchanger 402, or on the bottom of the battery module 400.

In other arrangements where, for example, power requirements for the battery module 10, 200, 400 are low, the battery module 10, 200, 400 planned usage is short-term, etc., the battery cell assemblies may not include growth plates.

What is claimed is:

1. A battery cell assembly method, comprising:
securing a growth plate within a first cell frame on at least two sides of the growth plate, the growth plate having a first face and a second face opposite the first face, wherein the first face of the growth plate includes a plurality of spacing features disposed along the first face of the growth plate, and each of the plurality of spacing features having a protruding portion extending away from the first face of the growth plate and contacting the first cell frame, the plurality of spacing features offsetting the first face of the growth plate from the first cell frame;
placing a battery cell having a first face and a second face opposite the first face within the first cell frame such that the first face of the battery cell contacts the second face of the growth plate;
aligning an outer peripheral of a second cell frame within an outer peripheral of the first cell frame such that the second cell frame contacts the second face of the battery cell; and
coupling the first cell frame to the second cell frame along an overlap of the outer peripheral of the first cell frame and the outer peripheral of the second cell frame such that a uniform pressure is applied along both the first and second faces of the battery cell.

2. The battery cell assembly method of claim 1, wherein the battery cell is capable of expanding, with the first face of the battery cell moving away from the second face of the battery cell as a result of the battery cell expanding.

3. The battery cell assembly method of claim 2, wherein the plurality of spacing features offsetting the first face of the growth plate from the first cell frame cooperate with the first cell frame to create a cavity between the first face of the growth plate and the first cell frame, wherein the cavity decreases when the battery cell expands.

4. The battery cell assembly method of claim 1, wherein the coupling includes welding the overlap of the outer peripheral of the first cell frame and the outer peripheral of the second cell frame.

5. The battery cell assembly method of claim 1, wherein the at least two sides of the growth plate include at least a first member and a second member opposite the first member, both the first member and the second member extending away from the second face of the growth plate, and further wherein the first member and the second member are coupled to the outer peripheral of the first cell frame.

6. The battery cell assembly method of claim 1, further comprising:
prior to coupling the first cell frame to the second cell frame, pressing the second cell frame toward the battery cell, such that a distance between the first cell frame and the second cell frame is reduced until a predetermined pressure along the battery cell is achieved.

7. The battery cell assembly method of claim 1, further comprising:
coupling the first cell frame to the second cell frame while maintaining a predetermined pressure along the battery cell.

8. The battery cell assembly method of claim 6, wherein the second cell frame is pressed toward the battery cell by a stack welding fixture or welding press.

9. The battery cell assembly method of claim 6, wherein the predetermined pressure is between 10 pounds per square inch and 50 pounds per square inch.

10. The battery cell assembly method of claim 4, wherein the first cell frame is coupled to the second cell frame by at least one of laser welding, electric resistance welding (ERW), gas metal arc welding (GMAW) or ultrasonic welding.

11. The battery cell assembly method of claim 4, wherein the first cell frame is coupled to the second cell frame by a fastening technique including screws or rivets.

12. The battery cell assembly method of claim 1 wherein the growth plate is secured into the first cell frame by at least one of laser welding, electric resistance welding (ERW), gas metal arc welding (GMAW), ultrasonic welding, or a fastening technique such as including screws or rivets.

13. The battery cell assembly method of claim 1, wherein securing the growth plate to the first cell plate includes welding the plurality of spacing features to the first cell frame.

14. The battery cell assembly method of claim 1, wherein the outer peripheral of the first cell frame extends towards the second cell frame, the outer peripheral of the second cell frame extends away from the second face of the battery cell, and the second cell frame, the growth plate and the battery cell are disposed within the outer peripheral of the first cell frame.

15. A battery cell assembly method, comprising:
placing a battery cell having a first face and a second face opposite the first face within a first cell frame having an outer peripheral, the first face of the battery cell facing towards the first cell frame;
aligning an outer peripheral of a second cell frame within the outer peripheral of the first cell frame such that a portion of the outer peripheral of the first cell frame forms an overlap with a portion of the outer peripheral of the second cell frame and the battery cell is disposed within a cavity formed by the first cell frame and the second cell frame;
applying a predetermined pressure to the battery cell by pressing the second cell frame toward the first cell frame; and
coupling the first cell frame to the second cell frame at the overlap while maintaining the predetermined pressure, wherein the predetermined pressure is in a range of 10 to 50 pounds per square inch.

16. The battery cell assembly method of claim 15, further comprising:
prior to placing the battery cell within the first cell frame, placing and securing a growth plate within the first cell frame, such that the growth plate is between the first cell frame and the battery cell.

17. The battery cell assembly method of claim 16, wherein the growth plate includes a first face and a second face opposite the first face, the first face of the growth plate includes a plurality of spacing features disposed along the first face of the growth plate, and each of the plurality of spacing features includes a protruding portion extending away from the first face of the growth plate and contacting the first cell frame, the plurality of spacing features offsetting the first face of the growth plate from the first cell frame.

18. The battery cell assembly method of claim 16, further comprising:
prior to placing and securing the growth plate within the first cell frame, placing a thermally conductive pad within the first cell frame, such that the thermally conductive pad is disposed between the first cell frame and the growth plate.

19. The battery cell assembly method of claim 15, wherein the first cell frame is coupled to the second cell frame at the overlap by at least one of laser welding, electric resistance welding (ERW), gas metal arc welding (GMAW), ultrasonic welding, or a fastening technique including screws or rivets.

20. A battery cell assembly method comprising:
- placing a battery cell having a first face and a second face opposite the first face within a first cell frame having an outer peripheral, the first face of the battery cell facing towards the first cell frame;
- aligning an outer peripheral of a second cell frame within the outer peripheral of the first cell frame such that a portion of the outer peripheral of the first cell frame forms an overlap with a portion of the outer peripheral of the second cell frame and the battery cell is disposed within a cavity formed by the first cell frame and the second cell frame;
- applying a predetermined pressure to the battery cell by pressing the second cell frame toward the first cell frame; and
- coupling the first cell frame to the second cell frame at the overlap while maintaining the predetermined pressure, wherein the outer peripheral of the first cell frame extends towards the second cell frame, and the outer peripheral of the second cell frame extends away from the first cell frame.

* * * * *